US012591109B2

(12) United States Patent
Chang et al.

(10) Patent No.: US 12,591,109 B2
(45) Date of Patent: Mar. 31, 2026

(54) OPTICAL REFLECTING ASSEMBLY, OPTICAL LENS ELEMENT MODULE AND ELECTRONIC DEVICE

(71) Applicant: LARGAN PRECISION CO., LTD., Taichung City (TW)

(72) Inventors: Ming-Shun Chang, Taichung City (TW); Chen-Wei Fan, Taichung City (TW); Ming-Ta Chou, Taichung City (TW); Chun-Hua Tsai, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 717 days.

(21) Appl. No.: 17/930,078

(22) Filed: Sep. 7, 2022

(65) Prior Publication Data

US 2023/0098359 A1 Mar. 30, 2023

Related U.S. Application Data

(60) Provisional application No. 63/247,818, filed on Sep. 24, 2021.

(51) Int. Cl.
*G02B 7/182* (2021.01)
*G02B 7/02* (2021.01)
(Continued)

(52) U.S. Cl.
CPC ............. *G02B 7/182* (2013.01); *G02B 7/021* (2013.01); *G02B 7/023* (2013.01); *G02B 7/1805* (2013.01);
(Continued)

(58) Field of Classification Search
CPC .. G02B 7/182; G02B 7/1805; G02B 13/0065; G02B 13/007; G03B 17/17
See application file for complete search history.

(56) References Cited

U.S. PATENT DOCUMENTS 9,338,357 B2 5/2016 Nomura et al.
10,962,737 B2 3/2021 Hu et al.
(Continued)

FOREIGN PATENT DOCUMENTS

CN 101363950 A 2/2009
CN 204143009 U 2/2015
(Continued)

OTHER PUBLICATIONS

Machine translation of CN209387960 retrieved electronically from PE2E Search Apr. 22, 2025 (Year: 2025).*

*Primary Examiner* — Cara E Rakowski

(74) *Attorney, Agent, or Firm* — McClure Qualey & Rodack, LLP

(57) ABSTRACT

An optical reflecting assembly includes a reflective member, a reflective element holder and a structure component. The reflective member includes a reflective surface for folding a light. The reflective element holder includes an assembling surface correspondingly disposed to the reflective member. The structure component is made of a metal material and has a three-dimensional structure, at least one portion of the structure component is inserted in the reflective element holder, and the structure component includes a first supporting wall, a second supporting wall and at least one extending wall. The first supporting wall and the second supporting wall are bent to form a first bending line with an angle. The extending wall and the second supporting wall are bent to form an extending bending line being a non-closed line.

18 Claims, 32 Drawing Sheets

(51) Int. Cl.
| | |
|---|---|
| *G02B 7/18* | (2021.01) |
| *G02B 13/00* | (2006.01) |
| *G02B 27/64* | (2006.01) |
| *G03B 17/17* | (2021.01) |

(52) U.S. Cl.
CPC ....... *G02B 13/0065* (2013.01); *G02B 27/646* (2013.01); *G03B 17/17* (2013.01)

(56) References Cited

U.S. PATENT DOCUMENTS

| | | | | |
|---|---|---|---|---|
| 2003/0048550 | A1* | 3/2003 | Atsumi | G02B 7/1805 |
| | | | | 359/633 |
| 2007/0024739 | A1* | 2/2007 | Konno | G02B 13/002 |
| | | | | 348/337 |
| 2009/0040631 | A1 | 2/2009 | Wong | |
| 2012/0075726 | A1* | 3/2012 | Takakubo | G02B 13/0065 |
| | | | | 359/726 |
| 2015/0215542 | A1 | 7/2015 | Nomura | |
| 2017/0294476 | A1* | 10/2017 | Hu | H04N 23/57 |
| 2018/0180834 | A1 | 6/2018 | Arai et al. | |
| 2019/0235202 | A1 | 8/2019 | Smyth | |
| 2019/0243120 | A1* | 8/2019 | Lin | G02B 13/0065 |
| 2022/0060610 | A1 | 2/2022 | Sugiura | |
| 2022/0163706 | A1* | 5/2022 | Feldman | G02B 13/0065 |

FOREIGN PATENT DOCUMENTS

| | | | |
|---|---|---|---|
| CN | 104865773 | A | 8/2015 |
| CN | 107395944 | A | 11/2017 |
| CN | 208172338 | U | 11/2018 |
| CN | 208888447 | U | 5/2019 |
| CN | 208907936 | U | 5/2019 |
| CN | 209387960 | U | 9/2019 |
| CN | 209387961 | U | 9/2019 |
| CN | 111050058 | A | 4/2020 |
| CN | 211554442 | U | 9/2020 |
| CN | 112327444 | A | 2/2021 |
| CN | 109425948 | B | 7/2021 |
| CN | 113168074 | A | 7/2021 |
| EP | 2923636 | A1 | 9/2015 |
| IN | 212083782 | U | 12/2020 |
| JP | 2002122904 | A | 4/2002 |
| TW | 201935124 | A | 9/2019 |

* cited by examiner

100

111

140

131

130

140

141

145

142

144

143

300

330b

340

310

330a

320a

340

341

342

343

344

345

343

441

442

443

444

446

445

440

540

541

542

544

545

543

90

91

90

OPTICAL REFLECTING ASSEMBLY, OPTICAL LENS ELEMENT MODULE AND ELECTRONIC DEVICE

RELATED APPLICATIONS

This application claims priority to U.S. Provisional Application Ser. No. 63/247,818, filed Sep. 24, 2021, which is herein incorporated by reference.

BACKGROUND

Technical Field

The present disclosure relates to an optical reflecting assembly and an optical lens element module. More particularly, the present disclosure relates to an optical reflecting assembly and an optical lens element module which are applicable to portable electronic devices.

Description of Related Art

In recent years, portable electronic devices have developed rapidly. For example, intelligent electronic devices and tablets have been filled in the lives of modern people, and optical lens element modules and optical reflecting assemblies thereof mounted on portable electronic devices have also prospered. However, as technology advances, the quality requirements of optical reflecting assemblies are becoming higher and higher.

Specifically, optical lens element modules that adopt folding light path is gradually increase, and the folding light path needs to use the reflective element holder to set the reflective member, and two light passing holes of the reflective element holder need to be folding disposed or eccentrically disposed. However, the abovementioned disposition will reduce the structural strength of the reflective element holder and deform by stress easily. Therefore, developing an optical reflecting assembly that can protect the reflective member and improve assembly reliability has become an important and urgent problem in the industry.

SUMMARY

According to one aspect of the present disclosure, an optical reflecting assembly includes a reflective member, a reflective element holder and a structure component. The reflective member includes a reflective surface, wherein a light enters the reflective surface and the light is folded via the reflective surface. The reflective element holder includes an assembling surface, and the assembling surface is correspondingly disposed to the reflective member. The structure component is made of a metal material and has a three-dimensional structure, at least one portion of the structure component is inserted in the reflective element holder, and the structure component includes a first supporting wall, a second supporting wall and at least one extending wall. The first supporting wall and the second supporting wall are bent to form a first bending line with an angle. The extending wall and the second supporting wall are bent to form an extending bending line, and the extending bending line is a non-closed line. When the angle between the first supporting wall and the second supporting wall after being bent is es, and a projection of the reflective member and the structure component is overlapped viewed along a direction, a minimum distance between the reflective member and the structure component on the direction is $D_R$, the following conditions are satisfied: 90 degrees$\leq\theta_S\leq$164 degrees; and 0.05 mm$<D_R<$1.8 mm.

According to another aspect of the present disclosure, an optical lens element module includes the optical reflecting assembly according to the foregoing aspect and a lens assembly. The reflective element holder further includes a lens holding portion. The lens assembly includes a plurality of lens elements, an optical axis passes through the lens elements, and the lens holding portion is for assembling and positioning the lens assembly.

According to another aspect of the present disclosure, an electronic device includes the optical reflecting assembly according to the foregoing aspect.

BRIEF DESCRIPTION OF THE DRAWINGS

The present disclosure can be more fully understood by reading the following detailed description of the embodiment, with reference made to the accompanying drawings as follows:

FIG. 10 is a cross-sectional view of the optical lens element module according to the 1st embodiment in FIG. 1A.

DETAILED DESCRIPTION

Figure 1A:
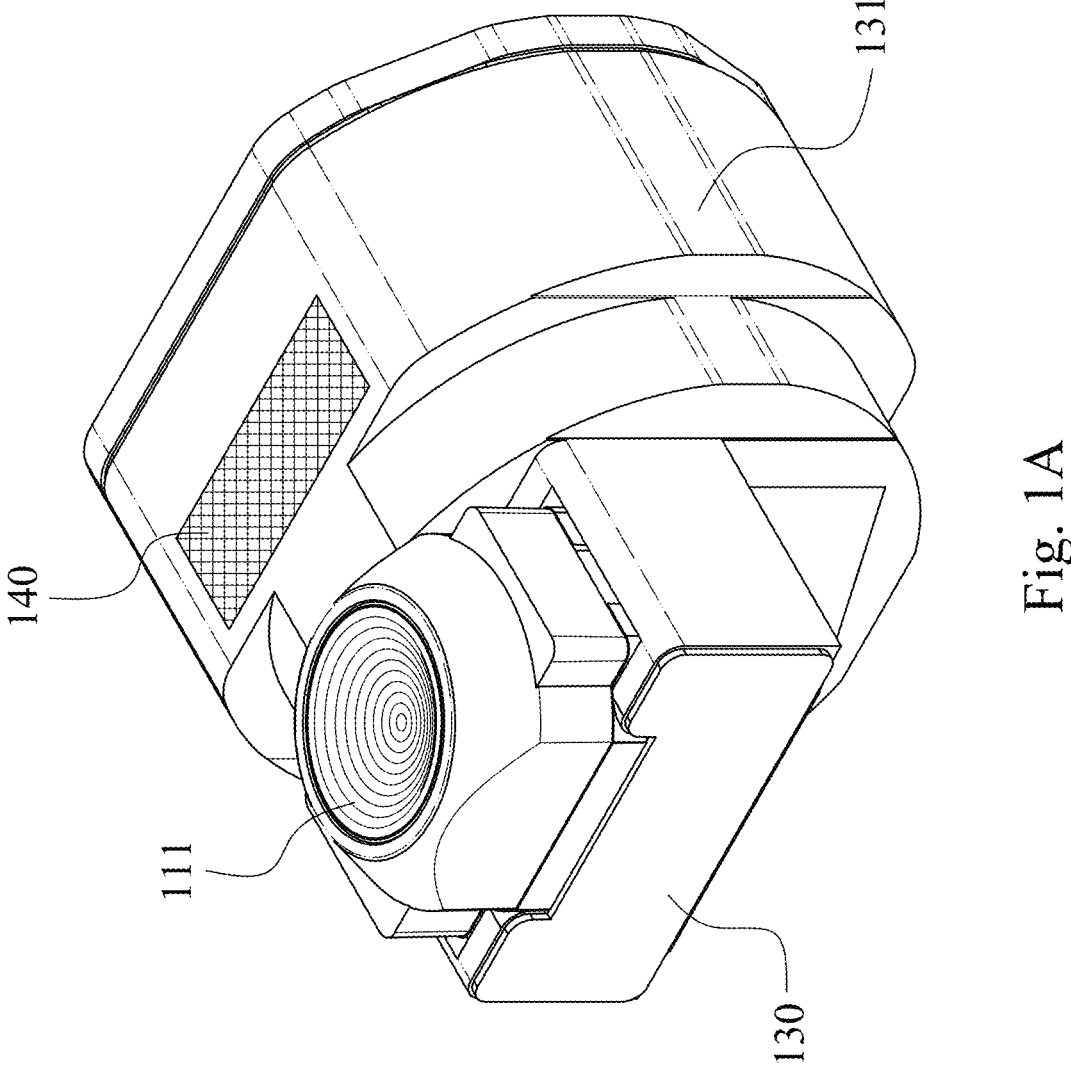
FIG. 1A is a three dimensional schematic view of an optical lens element module according to the 1st embodiment of the present disclosure.

The present disclosure provides an optical reflecting assembly, including a reflective member, a reflective element holder and a structure component. The reflective member includes a reflective surface, wherein a light enters the reflective surface and the light is folded via the reflective surface. The reflective element holder includes an assembling surface, wherein the assembling surface is correspondingly disposed to the reflective member. The structure component is made of a metal material and has a three-dimensional structure, at least one portion of the structure component is inserted in the reflective element holder, and the structure component includes a first supporting wall, a second supporting wall and at least one extending wall. The first supporting wall and the second supporting wall are bent to form a first bending line with an angle. The extending wall and the second supporting wall are bent to form an extending bending line, and the extending bending line is a non-closed line. When the angle between the first supporting wall and the second supporting wall after being bent is es, and a projection of the reflective member and the structure component is overlapped viewed along a direction, a minimum distance between the reflective member and the structure component on the direction is $D_R$, the following conditions are satisfied: 90 degrees $\leq \theta s \leq 164$ degrees; and 0.05 mm $< D_R < 1.8$ mm.

The rigidity of the reflective element holder can be improved by inserting the structure component, so that the structure of the reflective element holder can be maintained when being impacted by an external force, and the dimensional accuracy can also be maintained, or the bearing force can be increased during assembling to improve assembling reliability.

By arranging the first bending line and the extending bending line, the structure component can be the three-dimensional structure, so that it is favorable for improving the rigidity of the overall structure by bearing the stress of different directions.

The volume variation of the reflective element holder can also be inhibited by the structure component when the temperature changes, and the relative displacement between the reflective element holder and the reflective member can be reduced. The temperature variation may come from the ambient temperature or the heat source generated by the light source.

When 0.05 mm $< D_R < 1.8$ mm is satisfied, the better protection of the reflective member can be provided to avoid the deformation of the reflective element holder by stress, and can also avoid causing the reduction of the assembly accuracy of the reflective member or squeezing the reflective member.

The angle between the first supporting wall and the second supporting wall after being bent is depending on the structure of the reflective element holder. Therefore, when 90 degrees $\leq \theta_S \leq 164$ degrees is satisfied, the structure of the reflective element holder can be cooperated and can bear the impact of external forces of different directions.

Specifically, the non-closed line is a line section opened at two ends. The first bending line and the extending bending line are not the decorative lines on the structure component, but the crease formed at the bending section when stamping a metal plate. Further, the first bending line and the extending bending line can be a round corner, and a radius of curvature of the round corner is related to the angle of the bending.

Furthermore, the reflective member can be a hard brittle material, wherein the hard brittle material can be glass, polystyrene (PS), polycarbonate (PC), polymethyl methacrylate (PMMA), etc., which is not limited thereto. Due to the reflective member has the high requirement on the flatness of the assembling surface, the structure component is required to maintain the flatness.

The structure component made of the metal material has the higher Young's modulus, so that the deformation by the stress can be smaller. The metal surface can be performed the surface treatment, such as a roughening treatment or a blackening treatment, wherein the roughening treatment can improve the bonding strength between the plastic material and the metal material, and the blackening treatment can reduce the light reflectivity. In detail, the structure component can be made of the metal plate with a thickness of 0.15 mm by the stamping process, and the material of the metal plate can be stainless steel, aluminum, aluminum alloy, etc., which is not limited thereto.

The structure component and the reflective element holder can be formed integrally. Specifically, the structure component and the reflective element holder can be formed integrally by insert molding.

The reflective element holder can include two light passing holes, wherein the light passes through the light passing holes, and geometric center axes of the light passing holes do not coincide with each other. Specifically, the light passing holes of the reflective element holder can be eccentrically disposed or folding disposed. However, the above-mentioned disposition will reduce the structural strength of the reflective element holder easily. It must be noted that the shape of the reflective element holder is complex, and the plastic injection molding process can be used for the mass production. However, the structural strength is easily reduced and the warpage is easily generated by the complex shape. Therefore, the structural rigidity can be improved by inserting the structure component, and the deformation of the reflective element holder can be avoided.

A length of the extending bending line can be smaller than a length of the first bending line. Specifically, the extending wall has the use of supporting and protecting the reflective member. From the edge of the first supporting wall or the second supporting wall partially bent and extended, the extending wall can be cooperated with the complex shape of the reflective element holder by the shorter extending bending line. Specifically, the first bending line can be a straight line or a curved line.

The extending bending line can be the straight line. Therefore, the mass production manufacturability can be improved.

A number of the extending wall can be at least two, and the reflective member can further include a light incident surface, a light exiting surface and two connecting surfaces. The light enters and exits from the light incident surface and the light exiting surface of the reflective member, respectively. The connecting surfaces are connected to the light incident surface, the light exiting surface and the reflective surface. Each of the extending walls includes a flat surface, and each of the flat surfaces is correspondingly disposed to each of the connecting surfaces. Therefore, the protection of the reflective member can be enhanced by the extending wall.

The extending walls can be symmetrically arranged. Therefore, the structure component can be more stable.

The structure component can include a plurality of through holes, and the through holes are passed through at least one of the first supporting wall, the second supporting wall and the extending wall. Therefore, the quality of the injection molding can be improved, the bonding strength between the plastic and the metal can be increased, and the weight of the structure component can be reduced at the same time.

The reflective element holder can further include a gate, and the structure component can further include an exposed portion. The exposed portion is exposed to the reflective element holder, and the gate is disposed adjacent to the exposed portion. Therefore, the quality of the injection molding can be improved by the abovementioned disposition, and is favorable for the mass production.

A volume ratio of the structure component inserted in the reflective element holder can be more than 90% in an overall volume of the structure component. Therefore, the structural rigidity of the reflective element holder can be further improved.

The structure component may not protrude from a surface of the reflective element holder. Therefore, the interference of the structure component with other components can be avoided.

The reflective member can be made of a glass material. It must be noted that the glass material is the hard brittle material, which is easy to be broken when impacted by the external force, so that the protection with the structure component is required. Further, the reflective member can be made of a plastic material, and the surface is coated with a reflective layer, which is not limited thereto.

When an angle between the extending wall and the second supporting wall after being bent is $\theta_E$, the following condition is satisfied: 90 degrees$\leq\theta_E\leq$152 degrees. Therefore, when 90 degrees$\leq\theta_E\leq$152 degrees is satisfied, the shape of the reflective element holder can be partially extended to improve the impact resistance of the structure component.

Each of the aforementioned features of the optical reflecting assembly can be utilized in various combinations for achieving the corresponding effects.

The present disclosure provides an optical lens element module, which includes the aforementioned optical reflecting assembly and a lens assembly. The lens assembly includes a plurality of lens elements, and an optical axis passes through the lens elements, wherein the lens elements can include at least one glass lens element. The reflective element holder further includes a lens holding portion, and the lens holding portion is for assembling and positioning the lens assembly. Specifically, the lens holding portion can assemble the lens assembly directly or assemble the lens assembly indirectly by a lens barrel, and the glass lens element can bear the environment of high temperature and high humidity.

The present disclosure provides an electronic device, which includes the aforementioned optical reflecting assembly.

According to the aforementioned embodiment, specific examples are provided, and illustrated via figures.

1st Embodiment

Figure 1B:
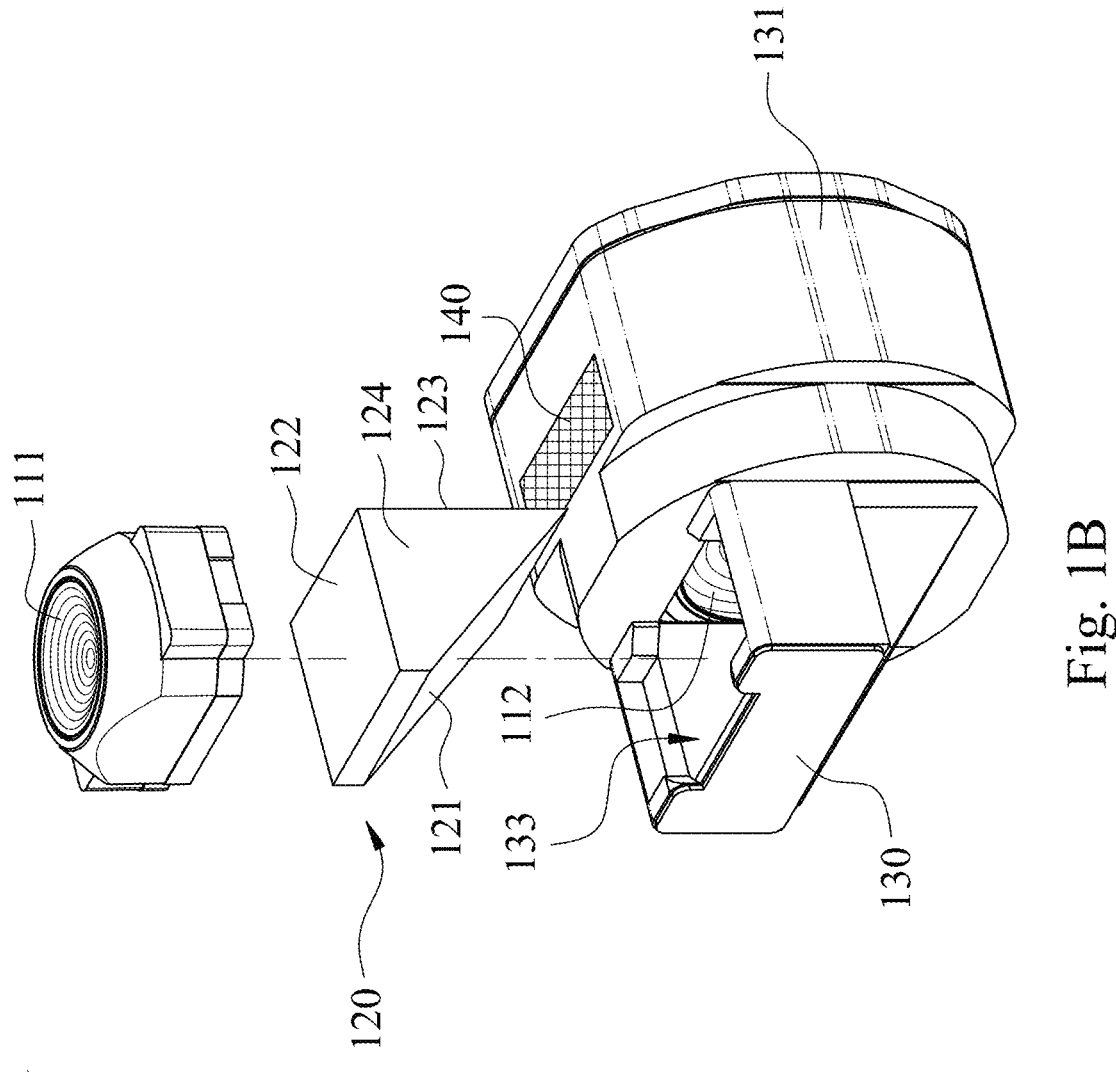
FIG. 1B is a partially exploded view of the optical lens element module according to the 1st embodiment in FIG. 1A.
Figure 1C:
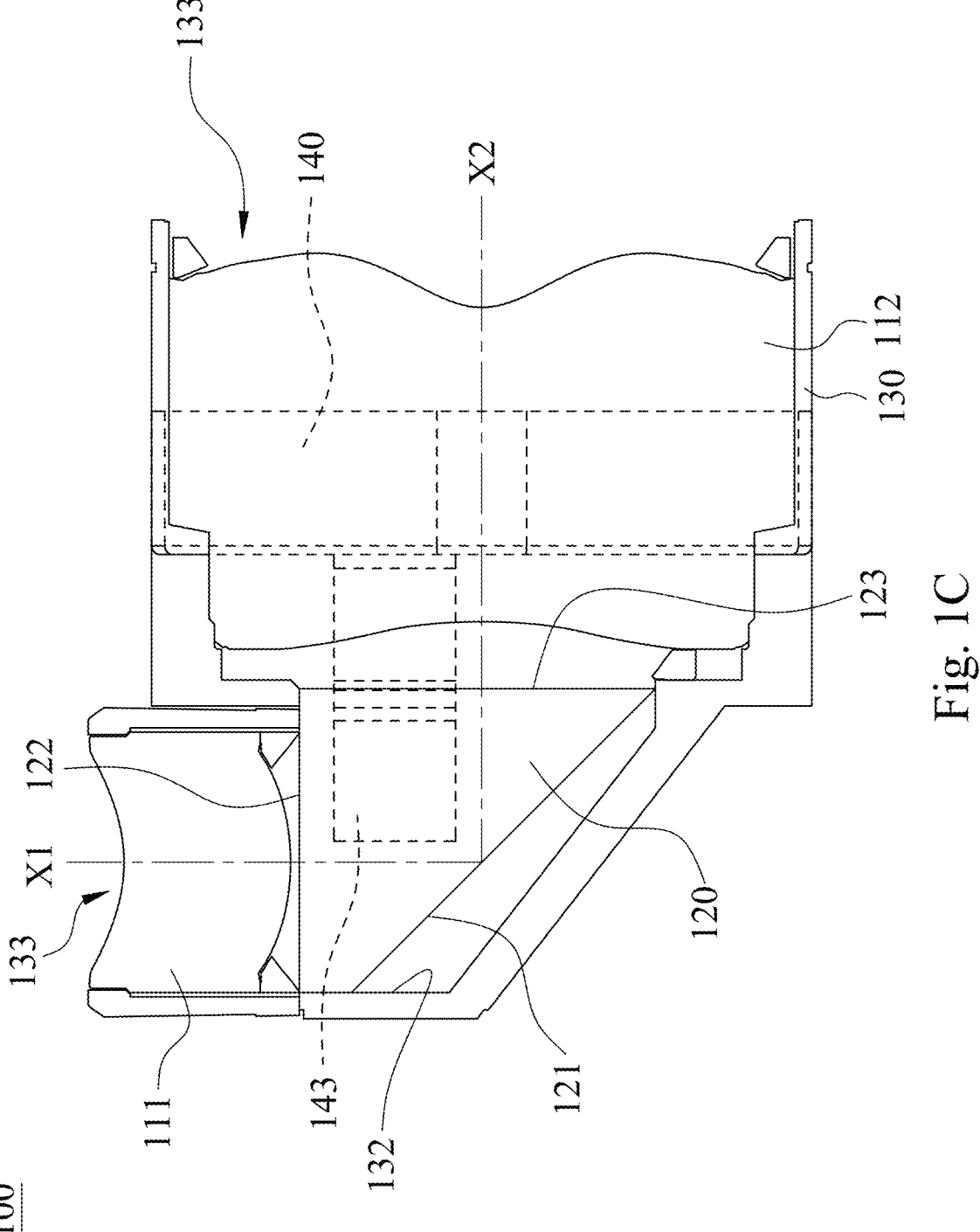
FIG. 1D is a top-perspective view of the optical lens element module according to the 1st embodiment in FIG. 1A.
FIG. 1E is a three dimensional schematic view of the optical reflecting assembly according to the 1st embodiment in FIG. 1A.
FIG. 1F is a partially cross-sectional view along line 1F-1F of the optical reflecting assembly according to the 1st embodiment in FIG. 1E.
FIG. 1G is a three dimensional schematic view of the structure component according to the 1st embodiment in FIG. 1A.
FIG. 1H is a perspective view of the structure component according to the 1st embodiment in FIG. 1A.
Figure 1D:
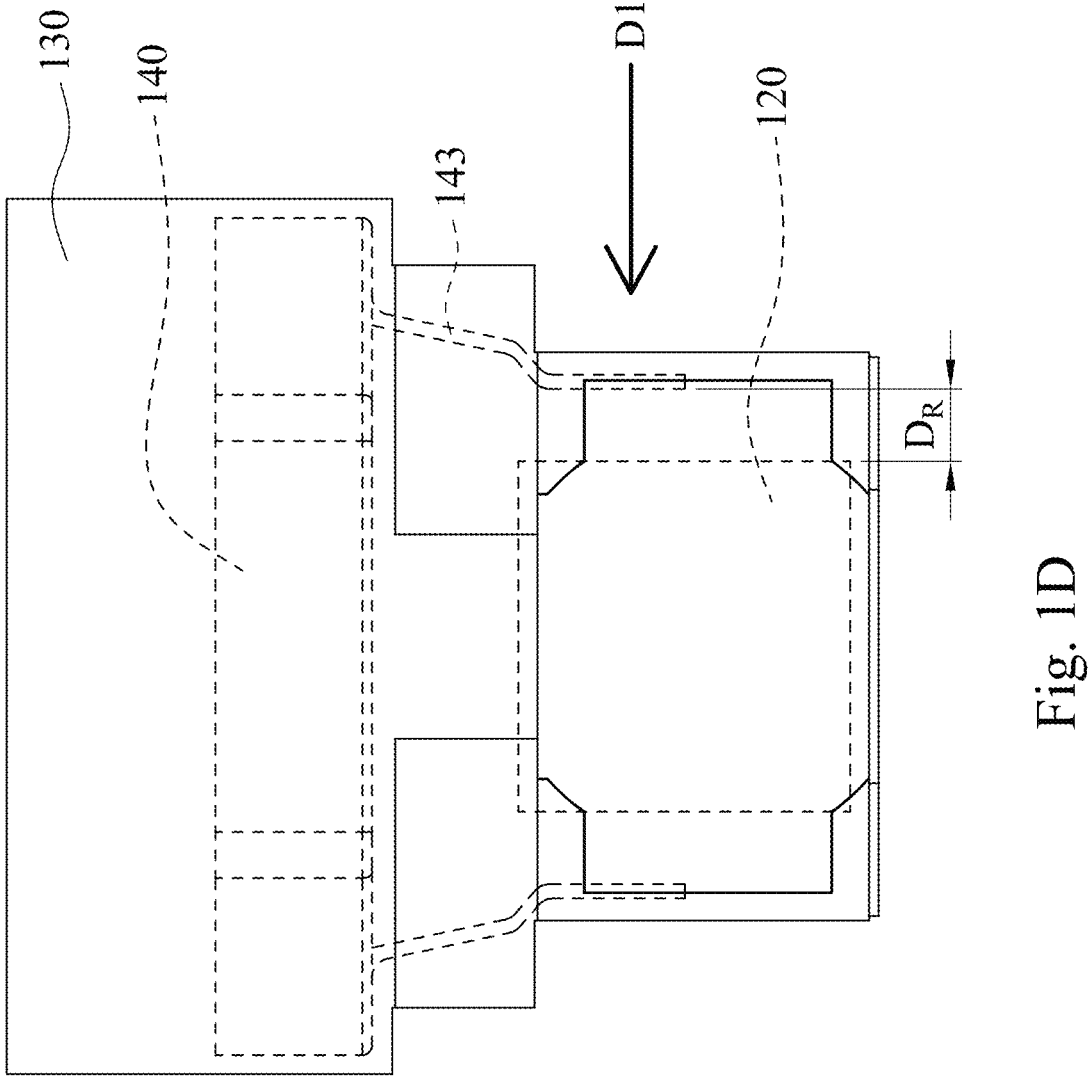

FIG. 1A is a three dimensional schematic view of an optical lens element module 100 according to the 1st embodiment of the present disclosure. FIG. 1B is a partially exploded view of the optical lens element module 100 according to the 1st embodiment in FIG. 1A. FIG. 1C is a cross-sectional view of the optical lens element module 100 according to the 1st embodiment in FIG. 1A. FIG. 1D is a top-perspective view of the optical lens element module 100 according to the 1st embodiment in FIG. 1A. In FIG. 1A to FIG. 1D, the optical lens element module 100 includes an optical reflecting assembly (not shown in drawings), a first lens assembly 111 and a second lens assembly 112, and the optical lens element module 100 has a first optical axis X1 and a second optical axis X2.

Figure 1E:
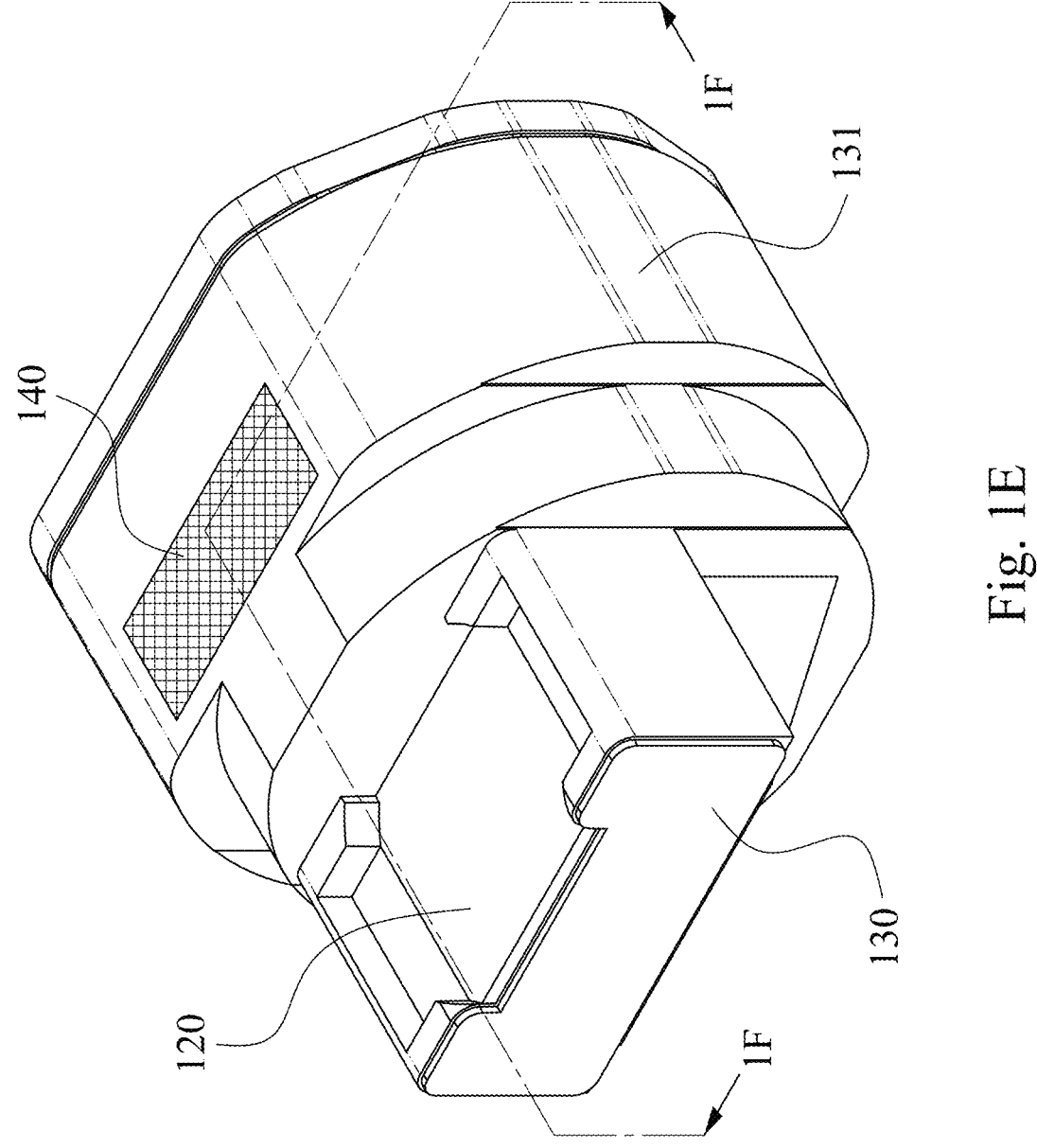
Figure 1F:
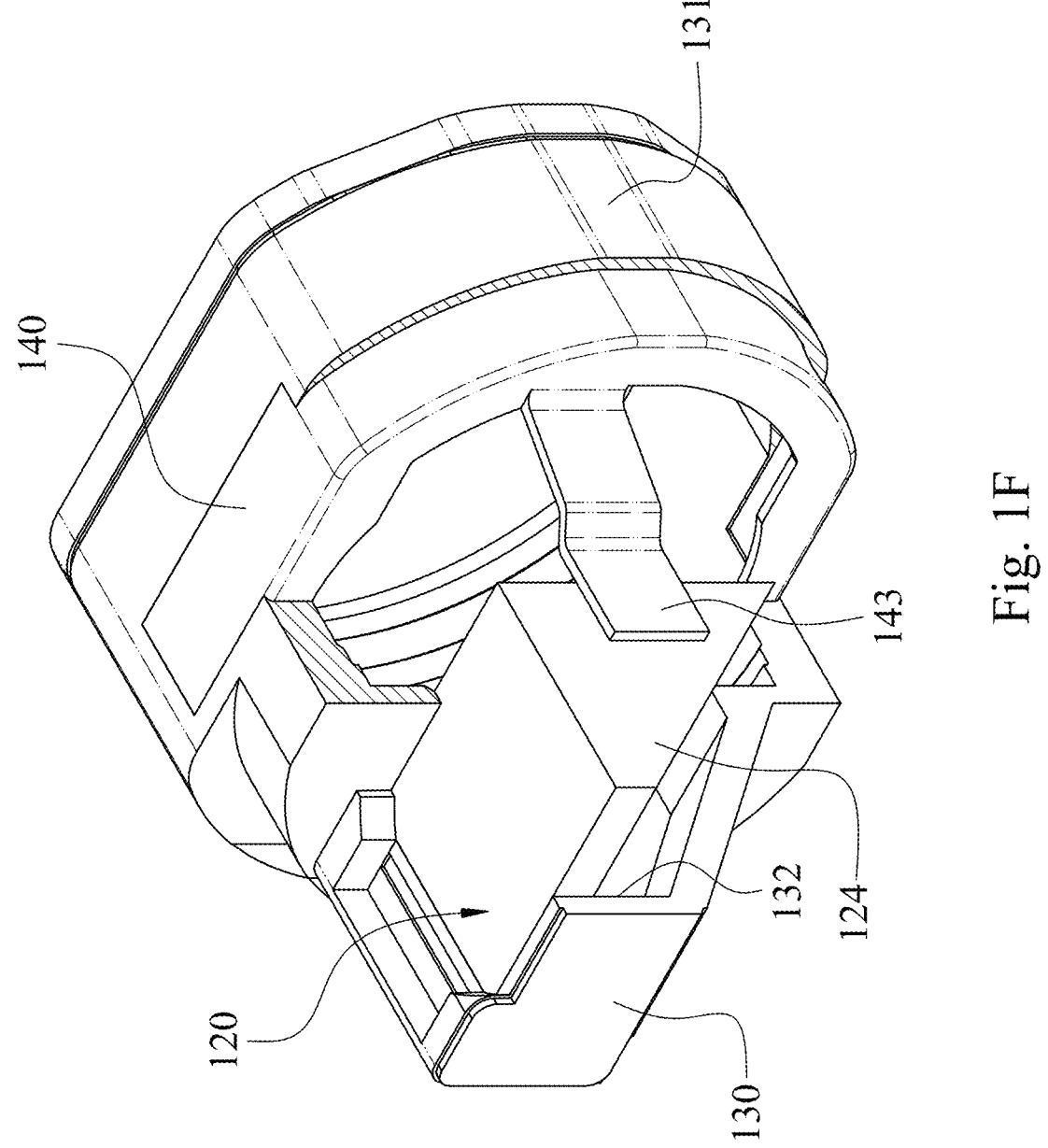

FIG. 1E is a three dimensional schematic view of the optical reflecting assembly according to the 1st embodiment in FIG. 1A. FIG. 1F is a partially cross-sectional view along line 1F-1F of the optical reflecting assembly according to the 1st embodiment in FIG. 1E. In FIG. 1A to FIG. 1F, the optical reflecting assembly includes a reflective member 120, a reflective element holder 130 and a structure component 140. The reflective element holder 130 is correspondingly disposed to the reflective member 120. At least one portion of the structure component 140 is inserted in the reflective element holder 130, and the structure component 140 and the reflective element holder 130 can be formed integrally by insert molding. The rigidity of the reflective element holder 130 can be improved by inserting the structure component 140, so that the structure of the reflective element holder 130 can be maintained when being impacted by an external force, and the dimensional accuracy can also be maintained, or the bearing force can be increased during assembling to improve assembling reliability. Further, the volume variation of the reflective element holder 130 can also be inhibited by the structure component 140 when the temperature changes, and the relative displacement between the reflective element holder 130 and the reflective member 120 can be reduced. The temperature variation may come from the ambient temperature or the heat source generated by the light source.

In FIG. 10, a light (not shown in drawings) enters the first lens assembly 111 along the direction of the first optical axis X1, and the reflective member 120 is for reflecting the light enters the second lens assembly 112 along the direction of the second optical axis X2. Specifically, the first lens assembly 111 and the second lens assembly 112 include a plurality of lens elements (not shown in drawings), respectively. The first optical axis X1 passes through the lens elements of the first lens assembly 111, and the second optical axis X2 passes through the lens elements of the second lens assembly 112. Furthermore, the lens elements include at least one glass lens element, and the glass lens element can bear the environment of high temperature and high humidity.

In FIG. 1B and FIG. 10, the reflective member 120 includes a reflective surface 121, a light incident surface 122, a light exiting surface 123 and two connecting surfaces 124, wherein the light enters the reflective surface 121 and the light is folded via the reflective surface 121. The light enters and exits from the light incident surface 122 and the light exiting surface 123 of the reflective member 120, respectively. The connecting surfaces 124 are connected to the light incident surface 122, the light exiting surface 123 and the reflective surface 121. Specifically, the reflective member 120 can be made of a hard brittle material, or the reflective member 120 can be made of a plastic material, and the surface is coated with a reflective layer. The hard brittle material can be glass, polystyrene (PS), polycarbonate (PC), polymethyl methacrylate (PMMA), etc., which is not limited thereto. Due to the hard brittle material, such as a glass material, is easy to be broken when impacted by the external force, so that the reflective member 120 needs the protection of the structure component 140. In the 1st embodiment, a number of the reflective surface 121 of the reflective member 120 is one.

In FIG. 1A to FIG. 10, the reflective element holder 130 includes a lens holding portion 131 and an assembling surface 132, wherein the lens holding portion 131 is for assembling and positioning the first lens assembly 111 and the second lens assembly 112, and the assembling surface 132 is correspondingly disposed to the reflective member 120. It must be noted that, due to the reflective member 120 has the high requirement on the flatness of the assembling surface 132, the structure component 140 is required to maintain the flatness. In the 1st embodiment, the lens holding portion 131 assembles the second lens assembly 112 directly, and assembles the first lens assembly 111 indirectly by a lens barrel (not shown in drawings).

In FIG. 10 and FIG. 1D, a volume ratio of the structure component 140 inserted in the reflective element holder 130 is more than 90% in an overall volume of the structure component 140, and the structure component 140 does not protrude from a surface of the reflective element holder 130. Therefore, the structural rigidity of the reflective element holder 130 can be further improved, and the interference of the structure component 140 with other components can be avoided.

In FIG. 1B and FIG. 10, the reflective element holder 130 includes two light passing holes 133, wherein the light passes through the light passing holes 133, and geometric center axes of the light passing holes 133 do not coincide with each other. The light passing holes 133 of the reflective element holder 130 can be eccentrically disposed or folding disposed. However, the abovementioned disposition will reduce the structural strength of the reflective element holder 130 easily. It must be noted that the shape of the reflective element holder 130 is complex, and the plastic injection molding process can be used for the mass production. However, the structural strength is easily reduced and the warpage is easily generated by the complex shape. Therefore, the structural rigidity can be improved by inserting the structure component 140, and the deformation of the reflective element holder 130 can be avoided.

Figure 1G:
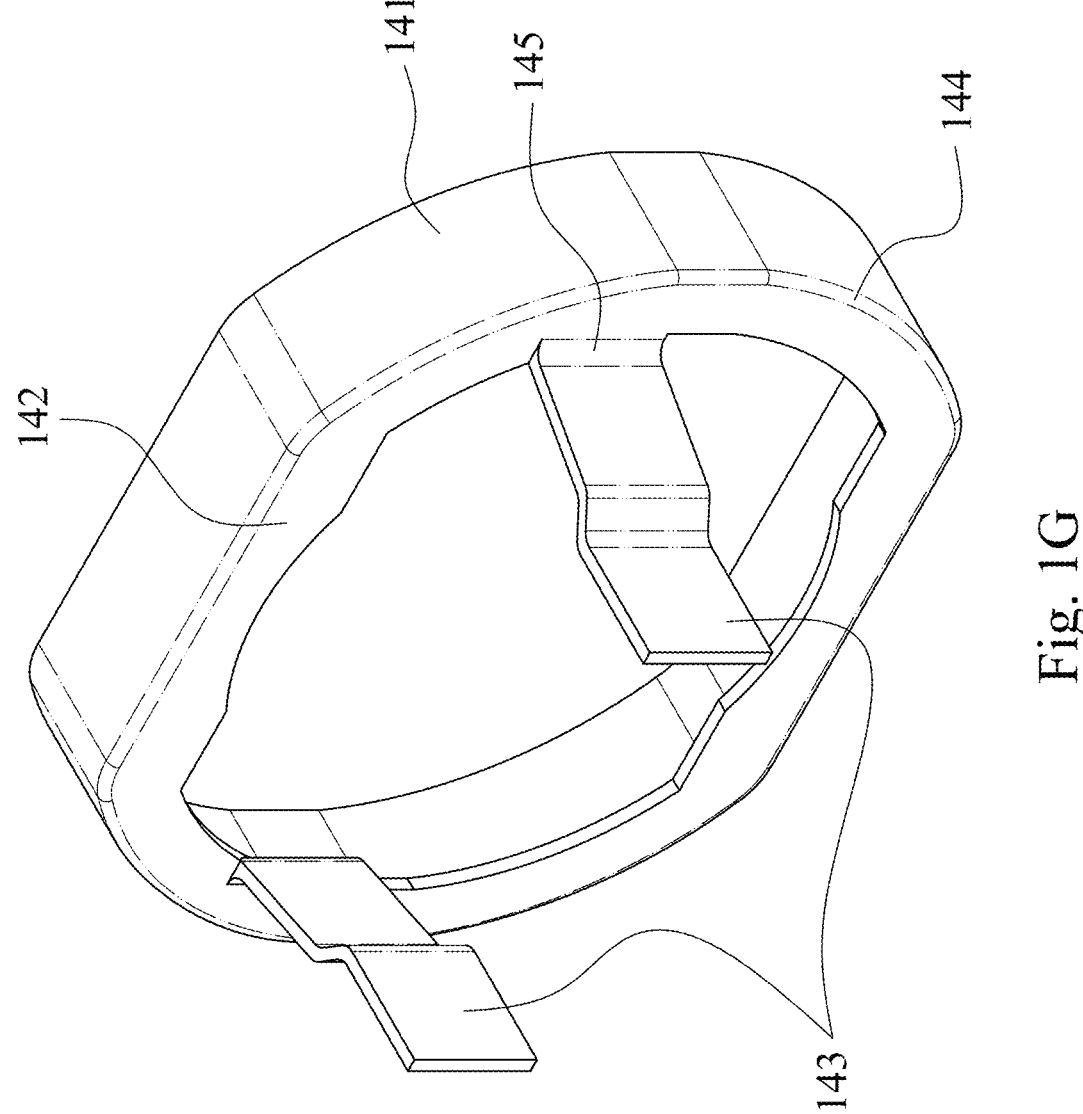
Figure 1H:
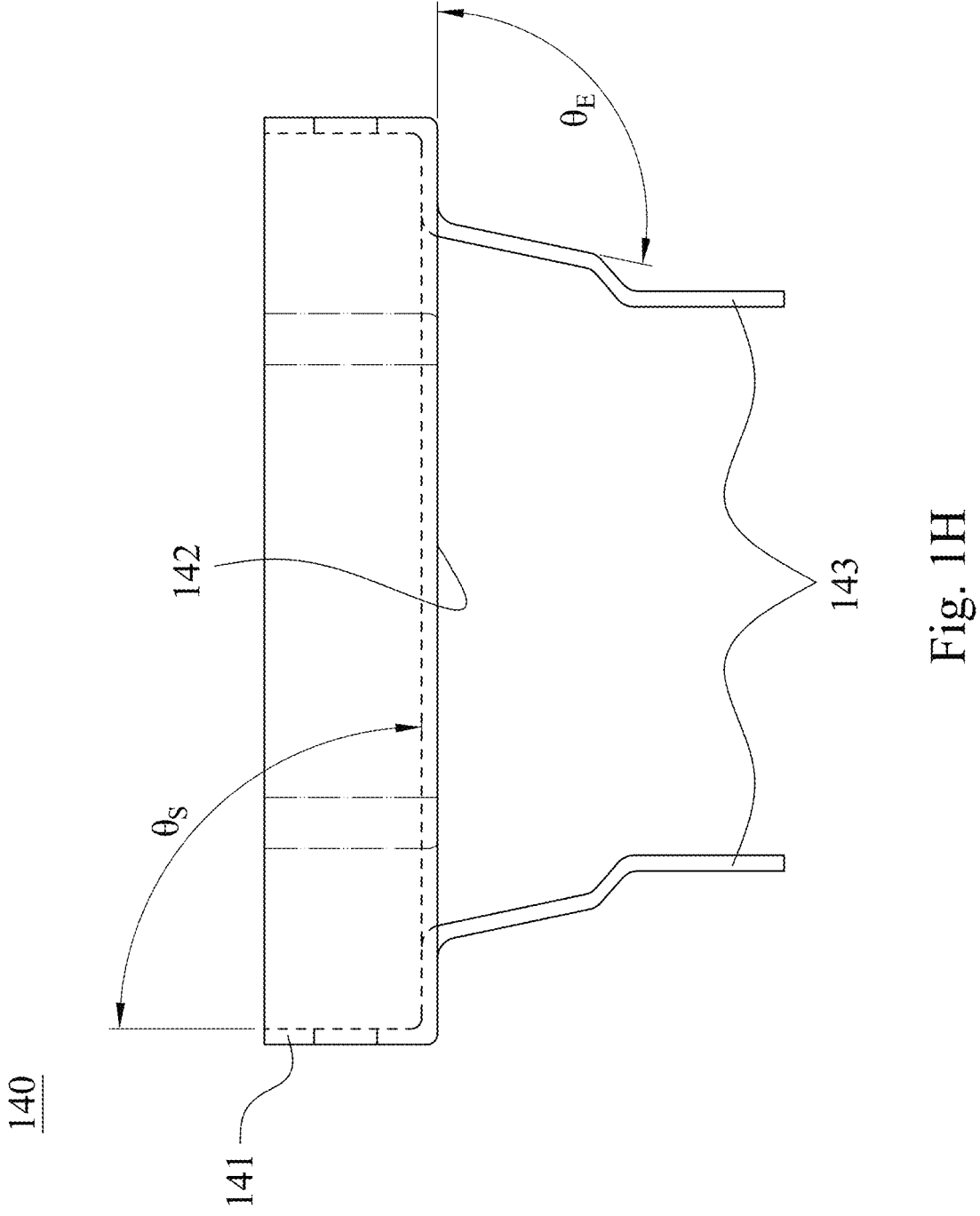

FIG. 1G is a three dimensional schematic view of the structure component 140 according to the 1st embodiment in FIG. 1A. FIG. 1H is a perspective view of the structure component 140 according to the 1st embodiment in FIG. 1A. In FIG. 1G and FIG. 1H, the structure component 140 is made of a metal material and has a three-dimensional structure, and the structure component 140 includes a first supporting wall 141, a second supporting wall 142 and at least one extending wall 143. The first supporting wall 141 and the second supporting wall 142 are bent to form a first bending line 144 with an angle. The extending wall 143 and the second supporting wall 142 are bent to form an extending bending line 145, and the extending bending line 145 is a non-closed line. By arranging the first bending line 144 and the extending bending line 145, the structure component 140 can be the three-dimensional structure, so that it is favorable for improving the rigidity of the overall structure by bearing the stress of different directions. In the 1st embodiment, a number of the extending wall 143 is two. It must be noted that the two-point chain line in FIG. 1A, FIG. 1B and FIG. 1E to FIG. 1H is for representing the edge tangent of the boundary of the curved surfaces.

The structure component 140 made of the metal material has the higher Young's modulus, so that the deformation by the stress can be smaller. The metal surface can be performed the surface treatment, such as a roughening treatment or a blackening treatment, wherein the roughening treatment can improve the bonding strength between the plastic material and the metal material, and the blackening treatment can reduce the light reflectivity. In detail, the structure component 140 can be made of a metal plate with a thickness of 0.15 mm by the stamping process, and the material of the metal plate can be stainless steel, aluminum, aluminum alloy, etc., which is not limited thereto.

Specifically, the non-closed line is a line section opened at two ends. The first bending line 144 and the extending bending line 145 are not the decorative lines on the structure component 140, but the crease formed at the bending section when stamping the metal plate. Further, the first bending line 144 and the extending bending line 145 can be a round corner, and a radius of curvature of the round corner is related to the angle of the bending.

In FIG. 1G, a length of the extending bending line 145 can be smaller than a length of the first bending line 144, wherein the first bending line 144 can be a straight line or a curved line, and the extending bending line 145 can be a straight line. Specifically, the extending wall 143 has the use of supporting and protecting the reflective member 120.

From the edge of the first supporting wall 141 or the second supporting wall 142 partially bent and extended, the extending wall 143 can be cooperated with the complex shape of the reflective element holder 130 by the shorter extending bending line 145. Further, the mass production manufacturability can be improved by the straight extending bending line 145.

In FIG. 1F, each of the extending walls 143 includes a flat surface (not shown in drawings), and each of the flat surfaces is correspondingly disposed to each of the connecting surfaces 124, wherein the extending walls 143 are symmetrically arranged. Therefore, the protection of the reflective member 120 can be enhanced by the extending wall 143, and the structure component 140 can be more stable.

In FIG. 1O and FIG. 1D, a projection of the reflective member 120 and the structure component 140 is overlapped viewed along a direction D1. In FIG. 1O, a projection of the reflective member 120 and the extending wall 143 of the structure component 140 is overlapped.

In FIG. 1D and FIG. 1H, when the angle between the first supporting wall 141 and the second supporting wall 142 after being bent is es, a minimum distance between the reflective member 120 and the structure component 140 on the direction D1 is $D_R$, and an angle between the extending wall 143 and the second supporting wall 142 after being bent is $\theta_E$, the following conditions of the Table 1 are satisfied.

TABLE 1

| 1st Embodiment | | | |
|---|---|---|---|
| $\theta_S$ (degree) | 90 | $\theta_E$ (degree) | 102 |
| $D_R$ (mm) | 0.76 | | |

2nd Embodiment

Figure 2:
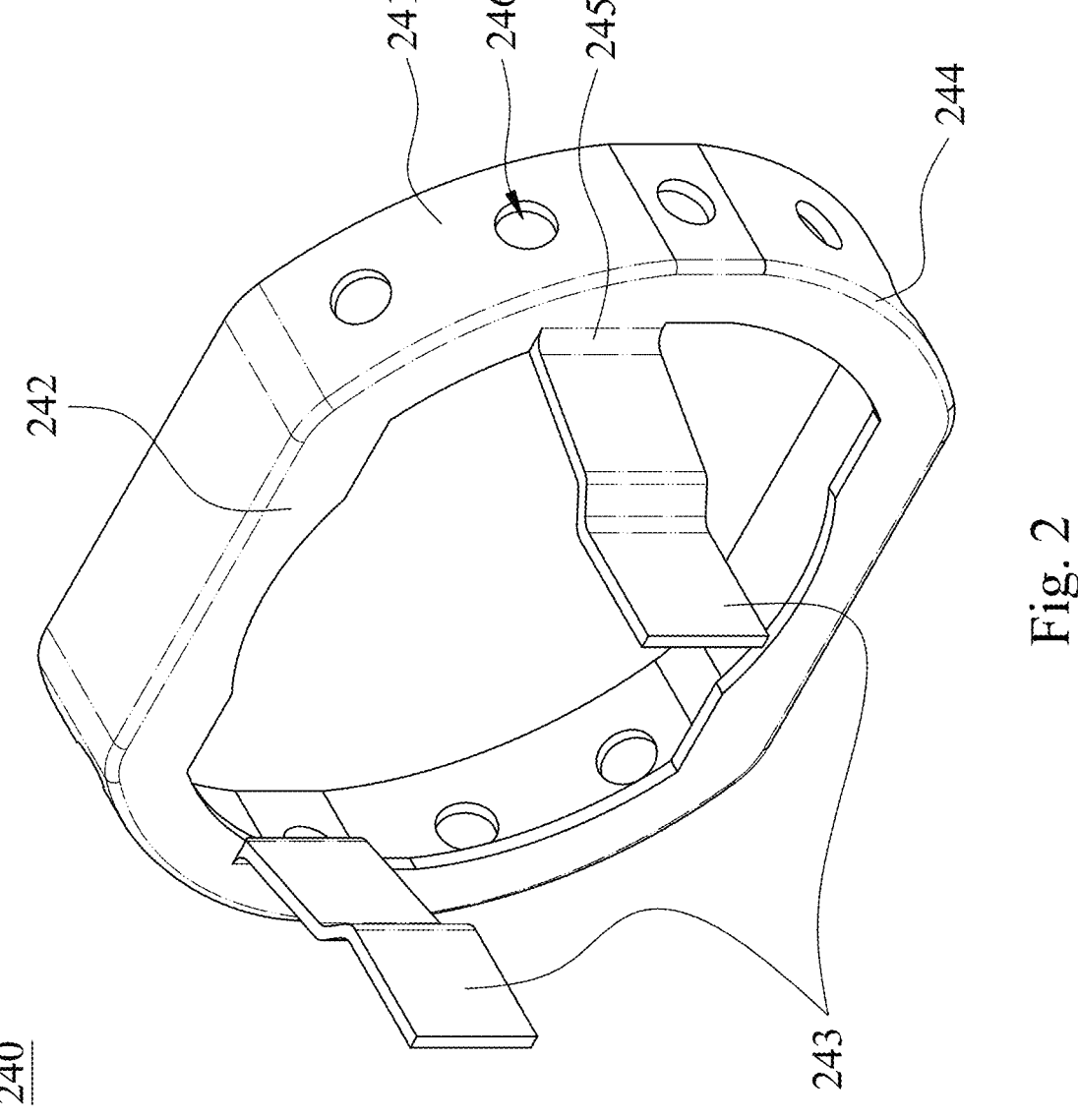
FIG. 2 is a three dimensional schematic view of a structure component according to the 2nd embodiment of the present disclosure.

FIG. 2 is a three dimensional schematic view of a structure component 240 according to the 2nd embodiment of the present disclosure. In FIG. 2, the structure component 240 is made of a metal material and has a three-dimensional structure, and the structure component 240 includes a first supporting wall 241, a second supporting wall 242 and at least one extending wall 243. The first supporting wall 241 and the second supporting wall 242 are bent to form a first bending line 244 with an angle. The extending wall 243 and the second supporting wall 242 are bent to form an extending bending line 245, and the extending bending line 245 is a non-closed line. By arranging the first bending line 244 and the extending bending line 245, the structure component 240 can be the three-dimensional structure, so that it is favorable for improving the rigidity of the overall structure by bearing the stress of different directions. In the 2nd embodiment, a number of the extending wall 243 is two.

Furthermore, the structure component 240 includes a plurality of through holes 246, and the through holes 246 are passed through the first supporting wall 241, wherein the shape of the through holes 246 is not limited thereto. Therefore, the quality of the injection molding can be improved, the bonding strength between the plastic and the metal can be increased, and the weight of the structure component 240 can be reduced at the same time.

It must be noted that the structure component 240 of the 2nd embodiment can be applied to the optical lens element module 100 of the 1st embodiment, but is not limited thereto.

Furthermore, the structures and the configurations of the remaining elements in the 2nd embodiment are the same as those in the 1st embodiment, and will not be described in herein.

3rd Embodiment

Figure 3A:
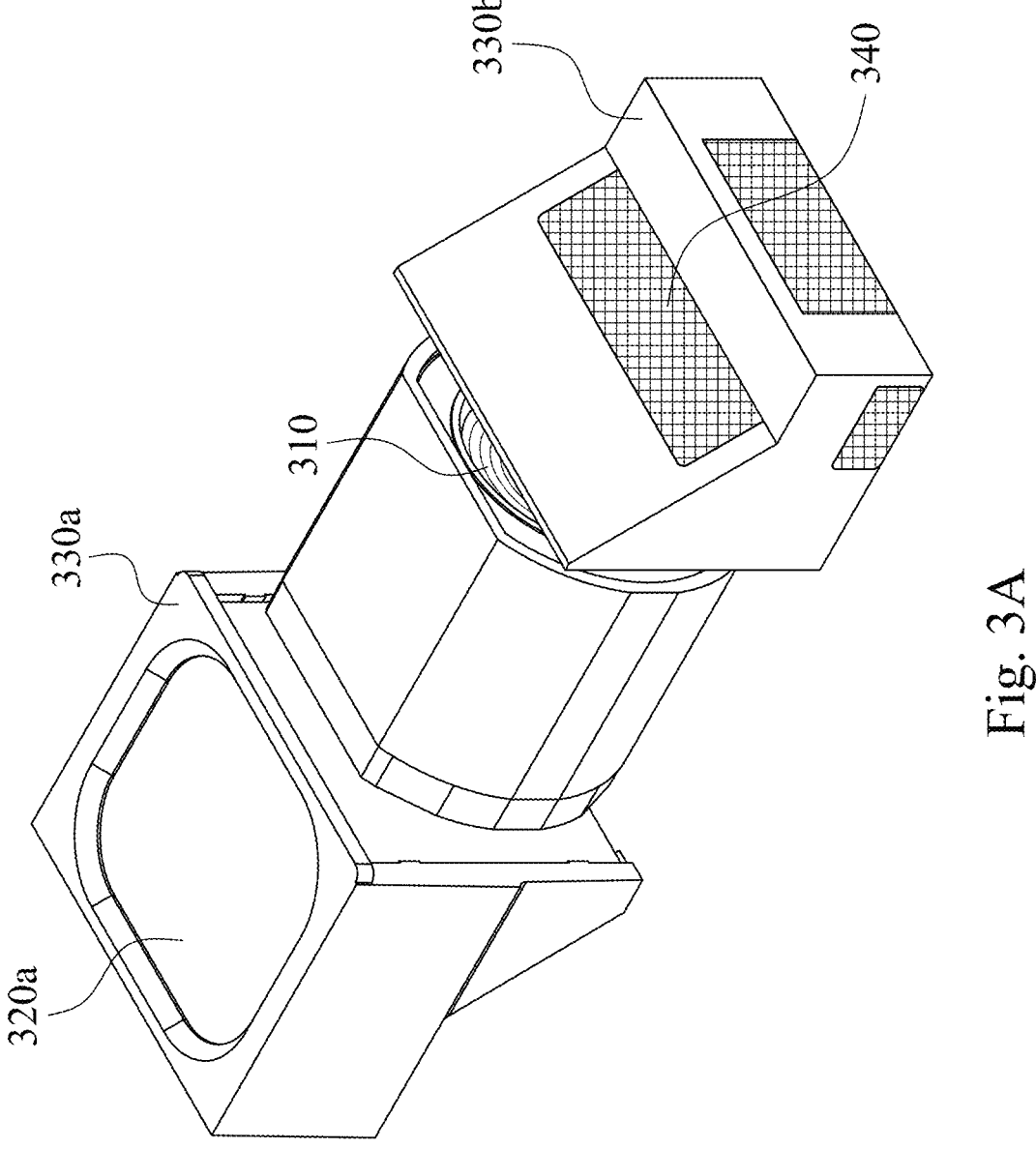
FIG. 3A is a three dimensional schematic view of an optical lens element module according to the 3rd embodiment of the present disclosure.
Figure 3B:
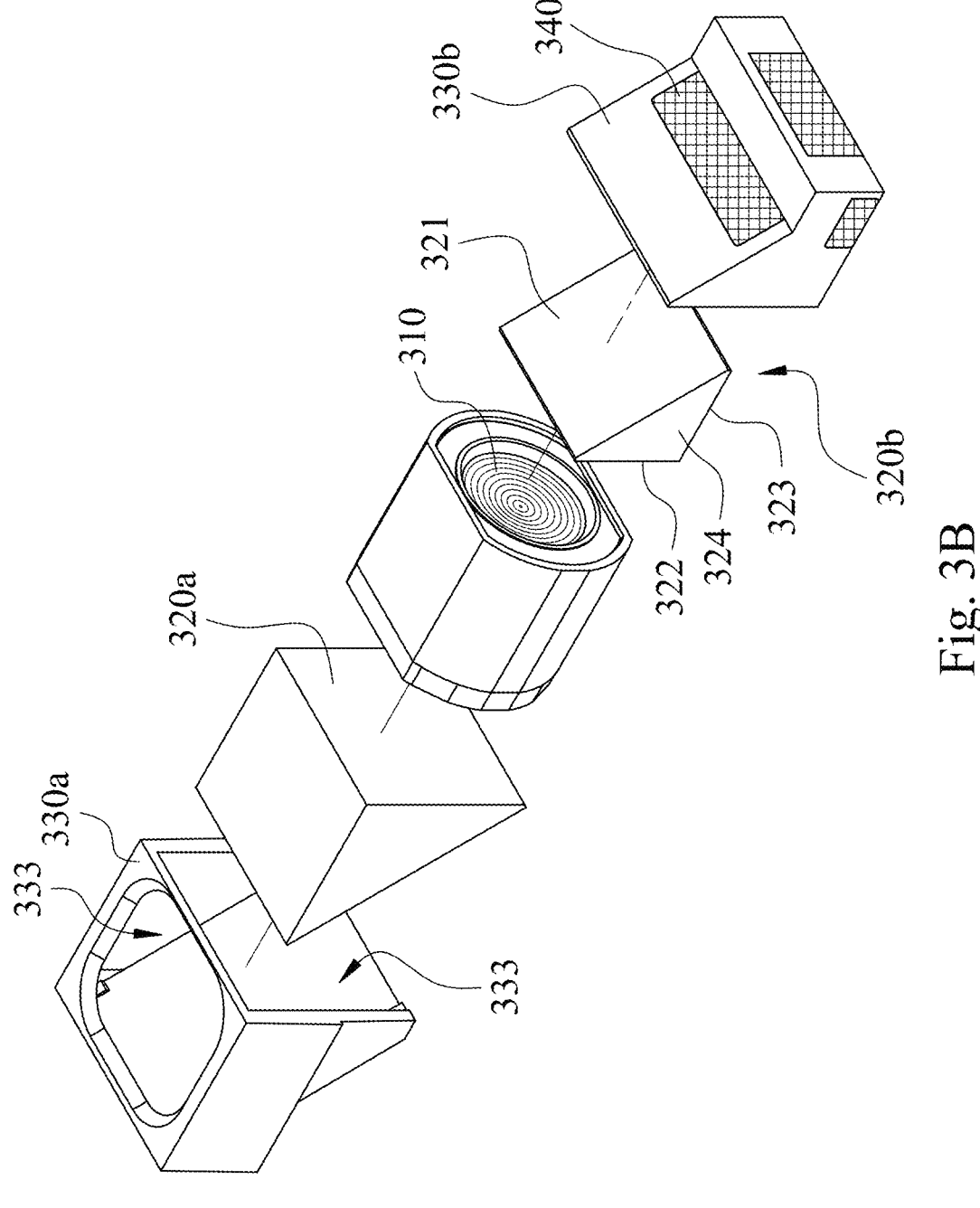
FIG. 3B is an exploded view of the optical lens element module according to the 3rd embodiment in FIG. 3A.
Figure 3C:
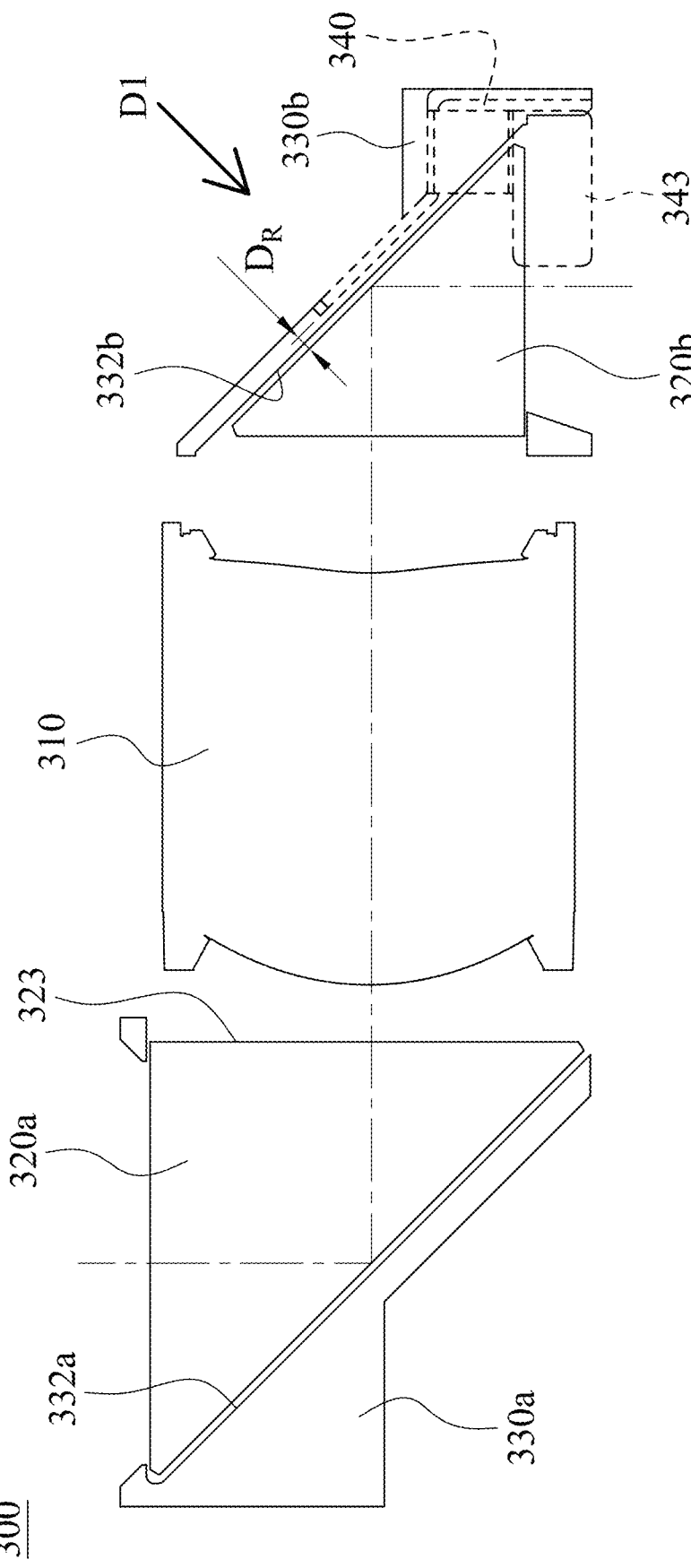
FIG. 3C is a cross-sectional view of the optical lens element module according to the 3rd embodiment in FIG. 3A.

FIG. 3A is a three dimensional schematic view of an optical lens element module 300 according to the 3rd embodiment of the present disclosure. FIG. 3B is an exploded view of the optical lens element module 300 according to the 3rd embodiment in FIG. 3A. FIG. 3C is a cross-sectional view of the optical lens element module 300 according to the 3rd embodiment in FIG. 3A. In FIG. 3A to FIG. 3C, the optical lens element module 300 includes an optical reflecting assembly (not shown in drawings) and a lens assembly 310.

Figure 3D:
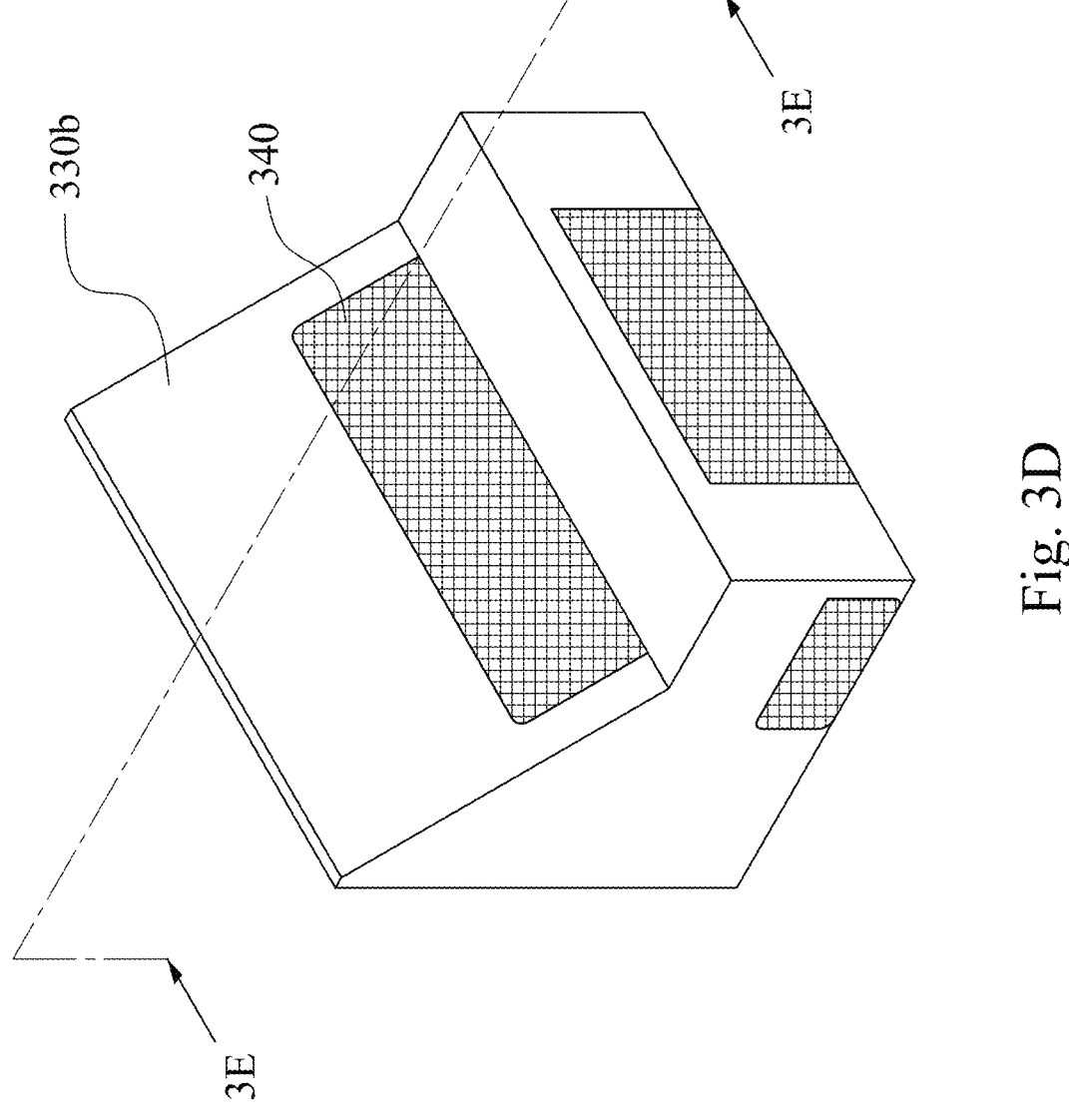
FIG. 3D is a three dimensional schematic view of the optical reflecting assembly according to the 3rd embodiment in FIG. 3A.
Figures 3E, 3F:
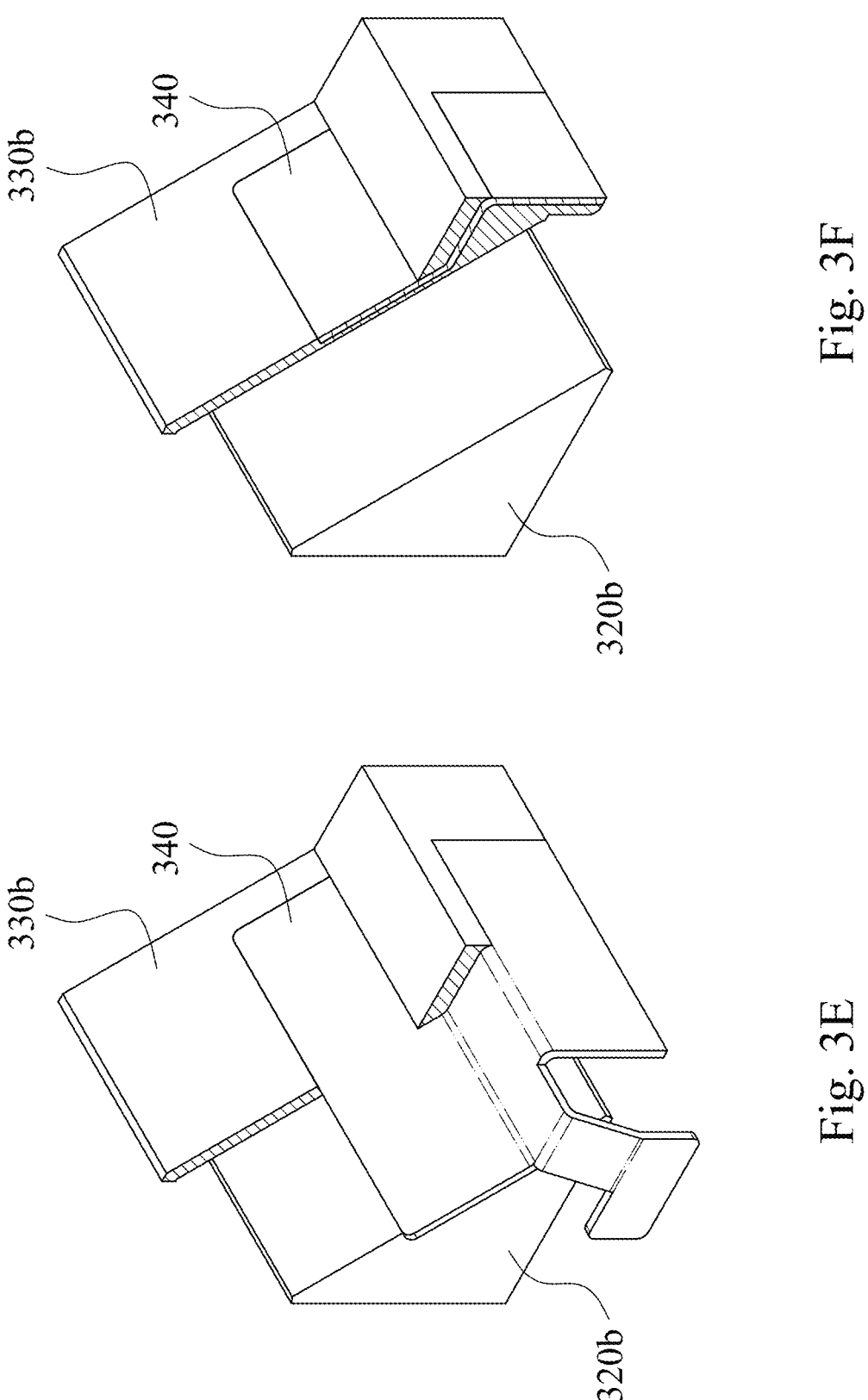
FIG. 3E is a partially cross-sectional view along line 3E-3E of the optical reflecting assembly according to the 3rd embodiment in FIG. 3D.
FIG. 3F is another partially cross-sectional view along line 3E-3E of the optical reflecting assembly according to the 3rd embodiment in FIG. 3D.

FIG. 3D is a three dimensional schematic view of the optical reflecting assembly according to the 3rd embodiment in FIG. 3A. FIG. 3E is a partially cross-sectional view along line 3E-3E of the optical reflecting assembly according to the 3rd embodiment in FIG. 3D. FIG. 3F is another partially cross-sectional view along line 3E-3E of the optical reflecting assembly according to the 3rd embodiment in FIG. 3D. In FIG. 3A to FIG. 3F, the optical reflecting assembly includes reflective members 320a, 320b, reflective element holders 330a, 330b and a structure component 340. The reflective element holder 330a is correspondingly disposed to the reflective member 320a, and the reflective element holder 330b is correspondingly disposed to the reflective member 320b. At least one portion of the structure component 340 is inserted in the reflective element holder 330b, and the structure component 340 and the reflective element holder 330b can be formed integrally by insert molding. The rigidity of the reflective element holder 330b can be improved by inserting the structure component 340, so that the structure of the reflective element holder 330b can be maintained when being impacted by an external force, and the dimensional accuracy can also be maintained, or the bearing force can be increased during assembling to improve assembling reliability. Further, the volume variation of the reflective element holder 330b can also be inhibited by the structure component 340 when the temperature changes, and the relative displacement between the reflective element holder 330b and the reflective member 320b can be reduced. The temperature variation may come from the ambient temperature or the heat source generated by the light source.

The lens assembly 310 includes a plurality of lens elements (not shown in drawings), wherein an optical axis (not shown in drawings) passes through the lens elements of the lens assembly 310, and the lens assembly 310 is disposed between the reflective members 320a, 320b. Furthermore, the lens elements include at least one glass lens element, and the glass lens element can bear the environment of high temperature and high humidity.

In FIG. 3B, the reflective members 320a, 320b include a reflective surface 321, a light incident surface 322, a light exiting surface 323 and two connecting surfaces 324 (taking the reference of the reflective member 320b as an example), respectively, wherein the light enters the reflective surface 321 and the light is folded via the reflective surface 321. The light enters and exits from the light incident surface 322 and the light exiting surface 323 of the reflective members 320a, 320b, respectively. The connecting surfaces 324 are connected to the light incident surface 322, the light exiting surface 323 and the reflective surface 321. Specifically, the reflective members 320a, 320b can be made of a hard brittle material, or the reflective members 320a, 320b can be made of a plastic material, and the surface is coated with a reflective layer. The hard brittle material can be glass, polystyrene (PS), polycarbonate (PC), polymethyl methacrylate (PMMA), etc., which is not limited thereto. Due to the hard brittle material, such as a glass material, is easy to be broken when impacted by the external force, so that the reflective members 320a, 320b need the protection of the structure component 340. In the 3rd embodiment, a number of the reflective surface 321 of the reflective members 320a, 320b is one, respectively.

In FIG. 3C, the reflective element holders 330a, 330b include a lens holding portion (not shown in drawings), and the reflective element holders 330a, 330b include an assembling surface 332a, 332b, respectively, wherein the lens holding portion is for assembling and positioning the lens assembly 310. The assembling surface 332a is correspondingly disposed to the reflective member 320a, and the assembling surface 332b is correspondingly disposed to the reflective member 320b. It must be noted that, due to the reflective members 320a, 320b have the high requirement on the flatness of the assembling surfaces 332a, 332b, the structure component 340 is required to maintain the flatness.

Specifically, the reflective element holders 330a, 330b include two light passing holes 333 (taking the reference of the reflective element holders 330a as an example), respectively, wherein a light (not shown in drawings) passes through the light passing holes 333, and geometric center axes of the light passing holes 333 do not coincide with each other.

In FIG. 3C, a volume ratio of the structure component 340 inserted in the reflective element holder 330b is more than 90% in an overall volume of the structure component 340, and the structure component 340 does not protrude from a surface of the reflective element holder 330b. Therefore, the structural rigidity of the reflective element holder 330b can be further improved, and the interference of the structure component 340 with other components can be avoided.

Figure 3G:
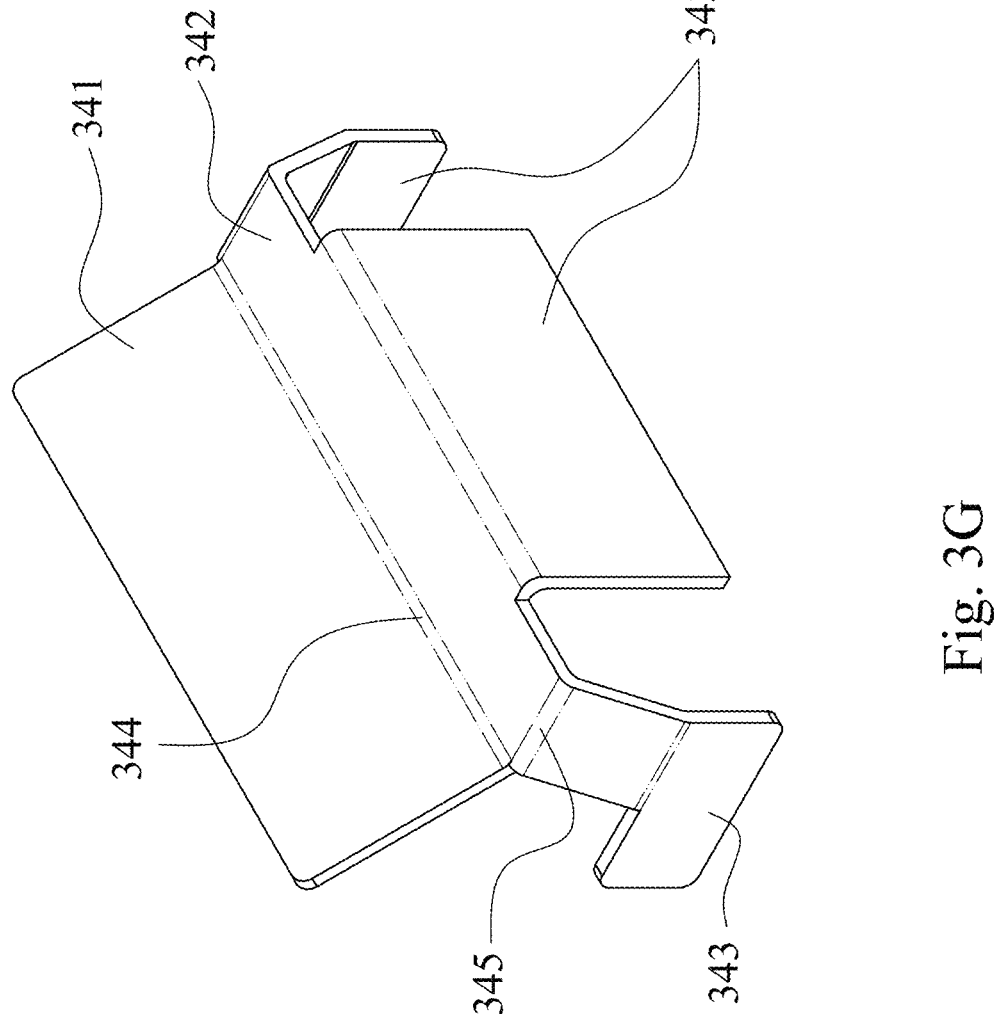
FIG. 3G is a three dimensional schematic view of the structure component according to the 3rd embodiment in FIG. 3A.
Figure 3I:
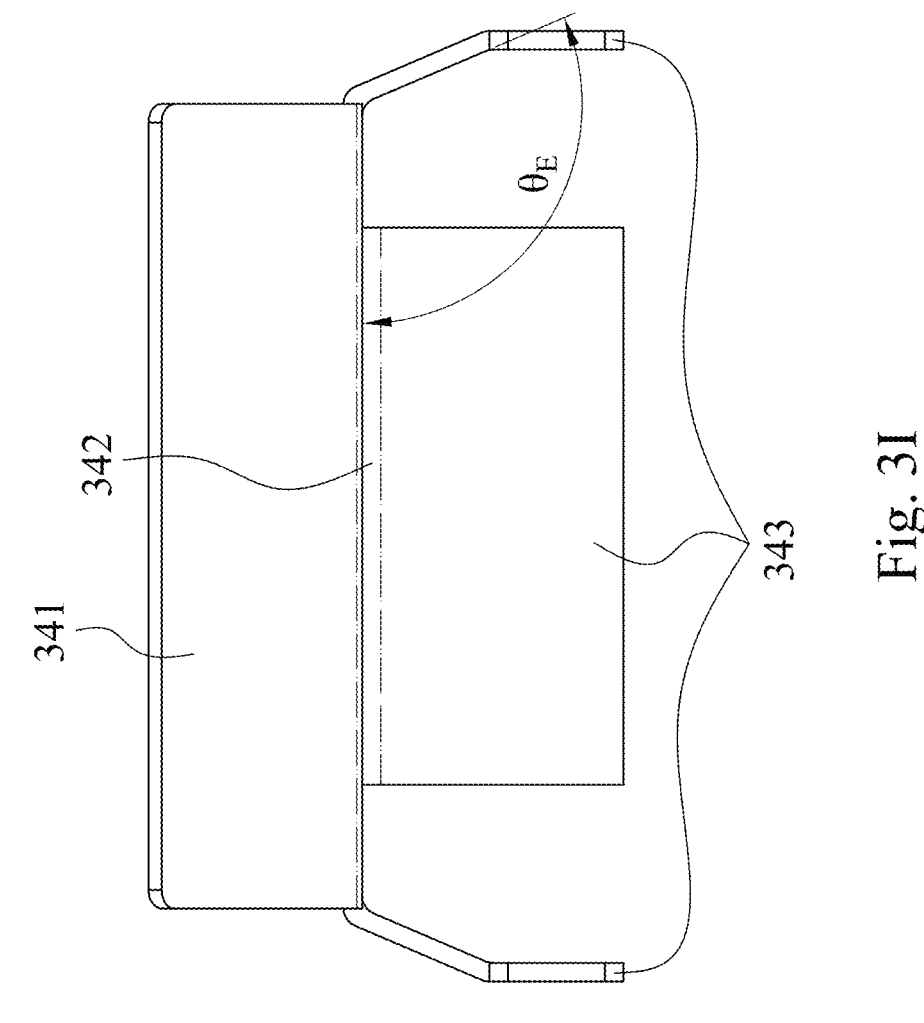
FIG. 3I is a front view of the structure component according to the 3rd embodiment in FIG. 3A.
Figure 3H:
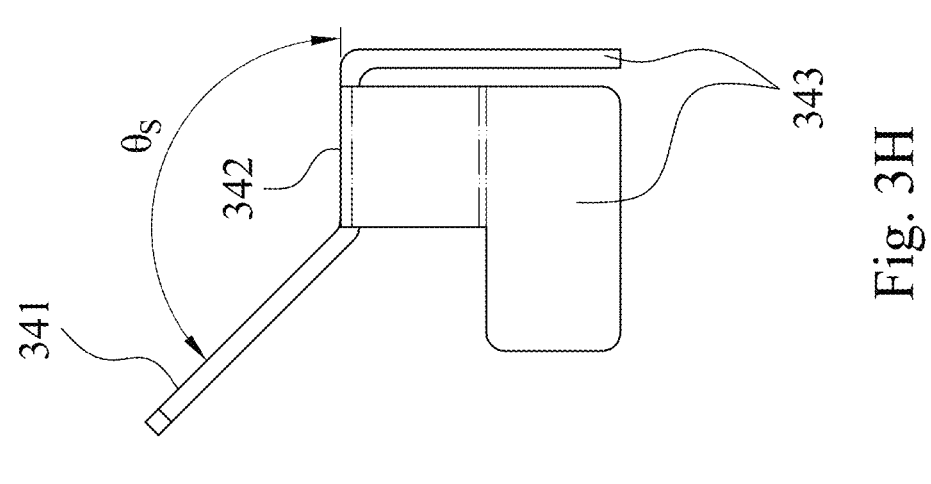
FIG. 3H is a side view of the structure component according to the 3rd embodiment in FIG. 3A.

FIG. 3G is a three dimensional schematic view of the structure component 340 according to the 3rd embodiment in FIG. 3A. FIG. 3H is a side view of the structure component 340 according to the 3rd embodiment in FIG. 3A. FIG. 3I is a front view of the structure component 340 according to the 3rd embodiment in FIG. 3A. In FIG. 3G to FIG. 3I, the structure component 340 is made of a metal material and has a three-dimensional structure, and the structure component 340 includes a first supporting wall 341, a second supporting wall 342 and at least one extending wall 343. The first supporting wall 341 and the second supporting wall 342 are bent to form a first bending line 344 with an angle. The extending wall 343 and the second supporting wall 342 are bent to form an extending bending line 345, and the extending bending line 345 is a non-closed line. By arranging the first bending line 344 and the extending bending line 345, the structure component 340 can be the three-dimensional structure, so that it is favorable for improving the rigidity of the overall structure by bearing the stress of different directions. In the 3rd embodiment, a number of the extending wall 343 is three.

The structure component 340 made of the metal material has the higher Young's modulus, so that the deformation by the stress can be smaller. The metal surface can be performed the surface treatment, such as a roughening treatment or a blackening treatment, wherein the roughening treatment can improve the bonding strength between the plastic material and the metal material, and the blackening treatment can reduce the light reflectivity. In detail, the structure component 340 can be made of a metal plate with a thickness of 0.15 mm by the stamping process, and the material of the metal plate can be stainless steel, aluminum, aluminum alloy, etc., which is not limited thereto.

Specifically, the non-closed line is a line section opened at two ends. The first bending line 344 and the extending bending line 345 are not the decorative lines on the structure component 340, but the crease formed at the bending section when stamping the metal plate. Further, the first bending line 344 and the extending bending line 345 can be a round corner, and a radius of curvature of the round corner is related to the angle of the bending.

In FIG. 3G, a length of the extending bending line 345 can be smaller than a length of the first bending line 344, wherein the first bending line 344 can be a straight line or a curved line, and the extending bending line 345 can be a straight line. Specifically, the extending wall 343 has the use of supporting and protecting the reflective member 320b. From the edge of the first supporting wall 341 or the second supporting wall 342 partially bent and extended, the extending wall 343 can be cooperated with the complex shape of the reflective element holder 330b by the shorter extending bending line 345. Further, the mass production manufacturability can be improved by the straight extending bending line 345.

In FIG. 3C, FIG. 3H and FIG. 3I, when the angle between the first supporting wall 341 and the second supporting wall 342 after being bent is θs, a projection of the reflective member 320b and the structure component 340 is overlapped viewed along a direction D1, a minimum distance between the reflective member 320b and the structure component 340 on the direction D1 is $D_R$, and an angle between the extending wall 343 and the second supporting wall 342 after being bent is $\theta_E$, the following conditions of the Table 2 are satisfied.

TABLE 2

| 3th Embodiment | | | |
| --- | --- | --- | --- |
| $\theta_S$ (degree) | 135 | $\theta_E$ (degree) | 113 |
| $D_R$ (mm) | 0.21 | | |

Furthermore, the structures and the configurations of the remaining elements in the 3th embodiment are the same as those in the 1st embodiment, and will not be described in herein.

4th Embodiment

Figure 4:
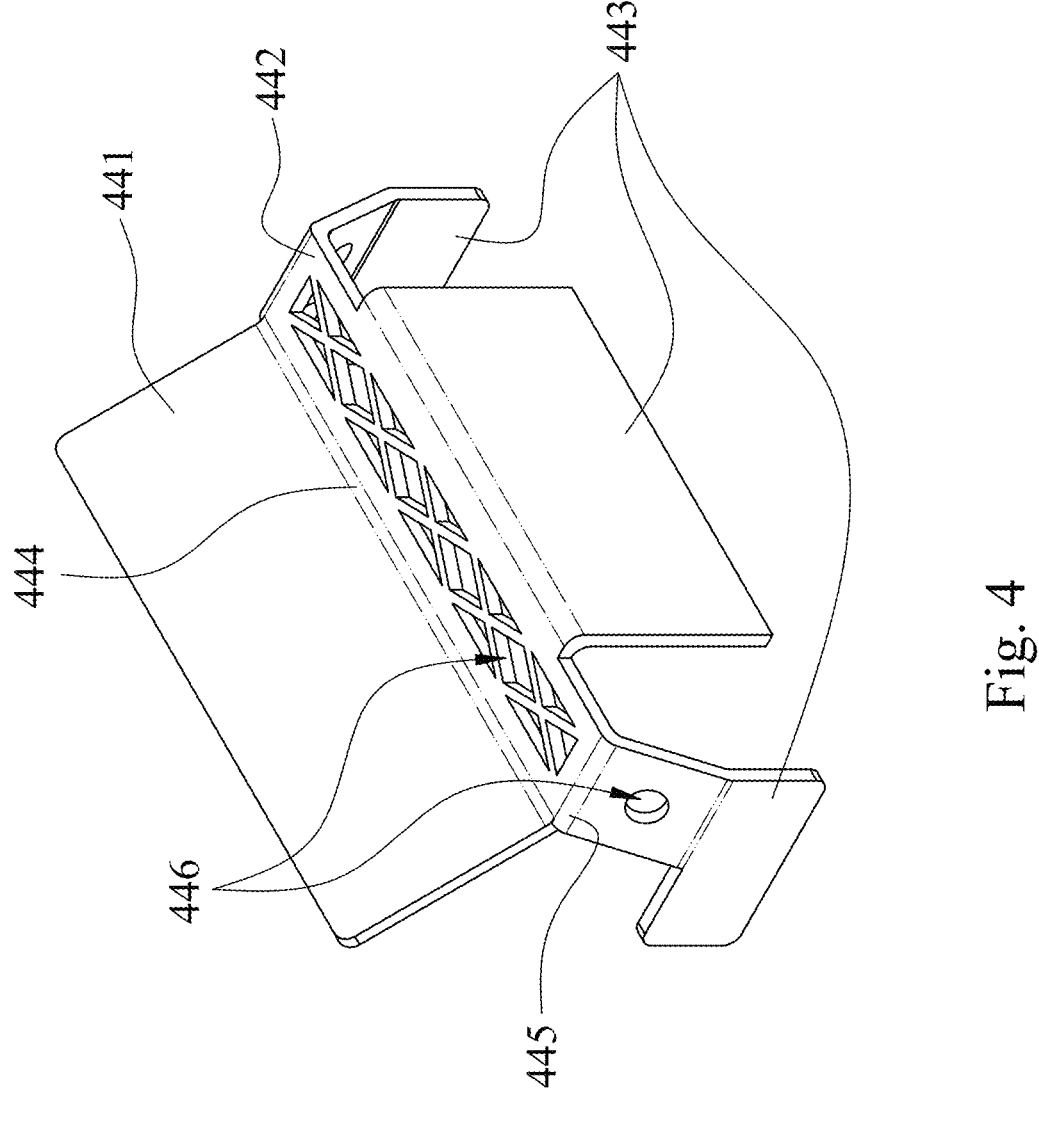
FIG. 4 is a three dimensional schematic view of a structure component according to the 4th embodiment of the present disclosure.

FIG. 4 is a three dimensional schematic view of a structure component 440 according to the 4th embodiment of the present disclosure. In FIG. 4, the structure component 440 is made of a metal material and has a three-dimensional structure, and the structure component 440 includes a first supporting wall 441, a second supporting wall 442 and at least one extending wall 443. The first supporting wall 441 and the second supporting wall 442 are bent to form a first bending line 444 with an angle. The extending wall 443 and the second supporting wall 442 are bent to form an extending bending line 445, and the extending bending line 445 is a non-closed line. By arranging the first bending line 444 and the extending bending line 445, the structure component 440 can be the three-dimensional structure, so that it is favorable for improving the rigidity of the overall structure by bearing the stress of different directions. In the 4th embodiment, a number of the extending wall 443 is three.

Furthermore, the structure component 440 includes a plurality of through holes 446, and the through holes 446 are passed through the second supporting wall 442 and the extending wall 443, wherein the shape of the through holes 446 is not limited thereto. Therefore, the quality of the injection molding can be improved, the bonding strength between the plastic and the metal can be increased, and the weight of the structure component 440 can be reduced at the same time.

It must be noted that the structure component 440 of the 4th embodiment can be applied to the optical lens element module 300 of the 3rd embodiment, but is not limited thereto.

Furthermore, the structures and the configurations of the remaining elements in the 4th embodiment are the same as those in the 1st embodiment and the 3rd embodiment, and will not be described in herein.

5th Embodiment

Figure 5A:
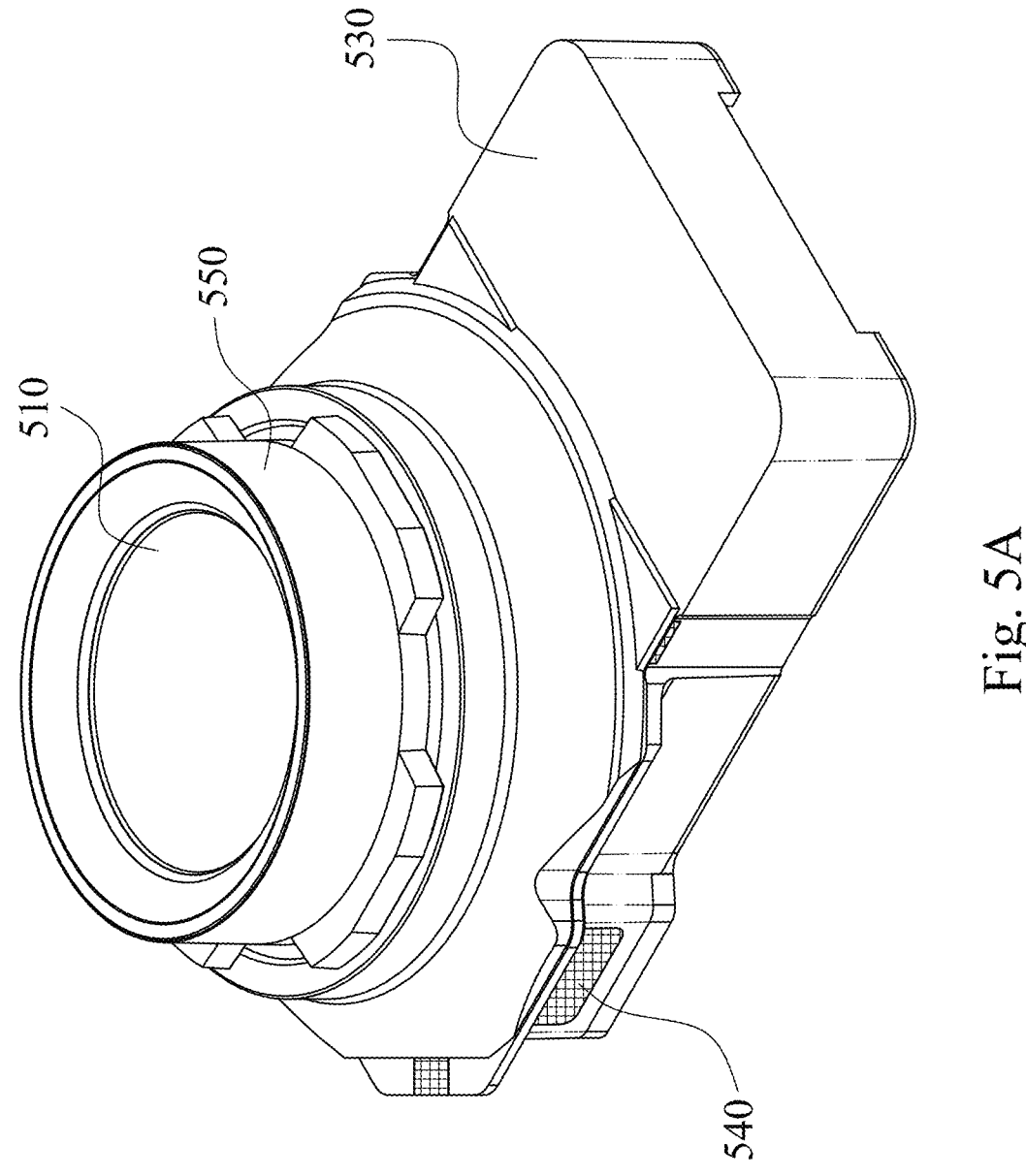
FIG. 5A is a three dimensional schematic view of an optical lens element module according to the 5th embodiment of the present disclosure.
Figure 5B:
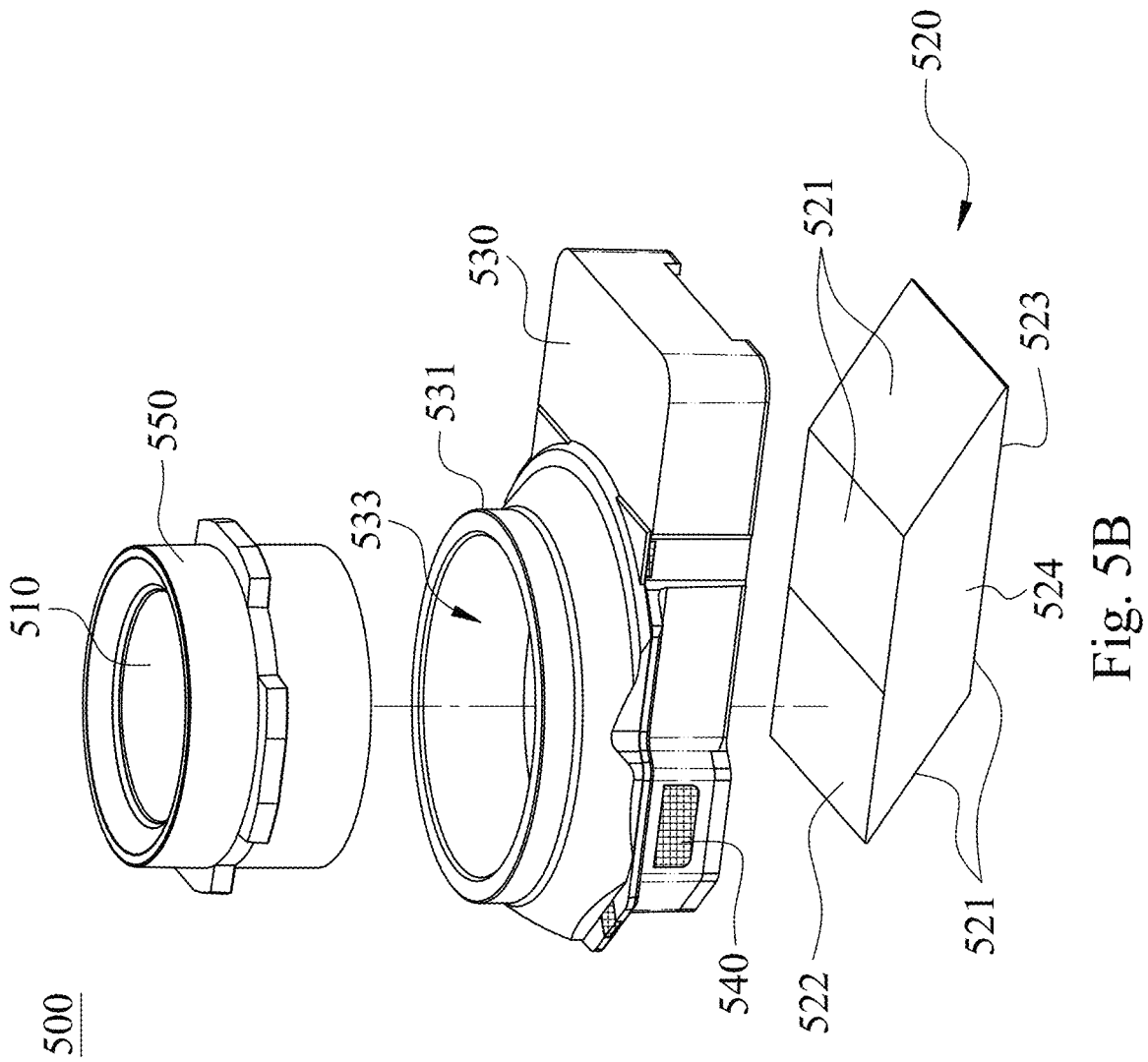
FIG. 5B is an exploded view of the optical lens element module according to the 5th embodiment in FIG. 5A.
Figure 5C:
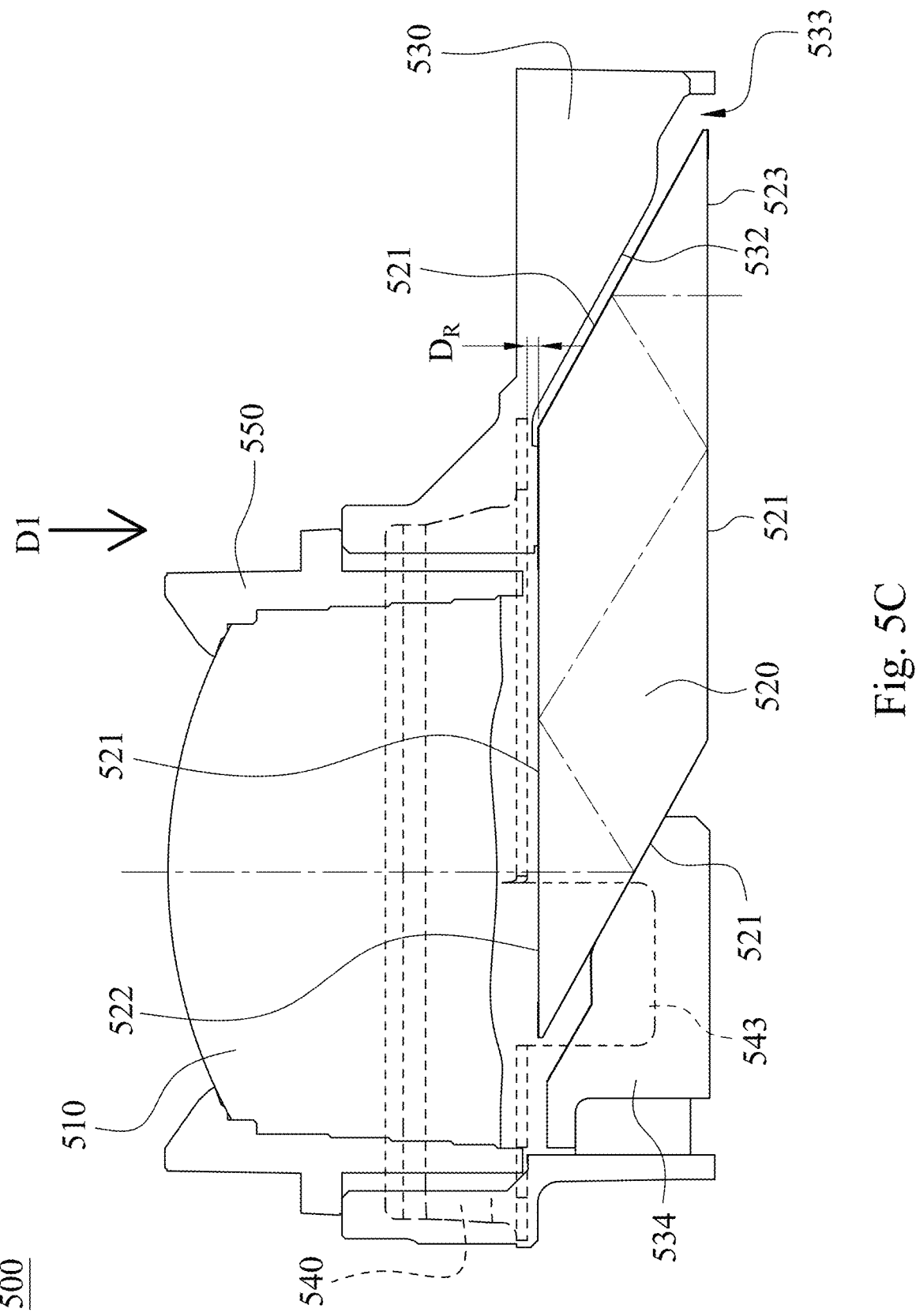
FIG. 5C is a cross-sectional view of the optical lens element module according to the 5th embodiment in FIG. 5A.

FIG. 5A is a three dimensional schematic view of an optical lens element module 500 according to the 5th embodiment of the present disclosure. FIG. 5B is an exploded view of the optical lens element module 500 according to the 5th embodiment in FIG. 5A. FIG. 5C is a cross-sectional view of the optical lens element module 500 according to the 5th embodiment in FIG. 5A. In FIG. 5A to FIG. 5C, the optical lens element module 500 includes an optical reflecting assembly (not shown in drawings) and a lens assembly 510.

Figure 5D:
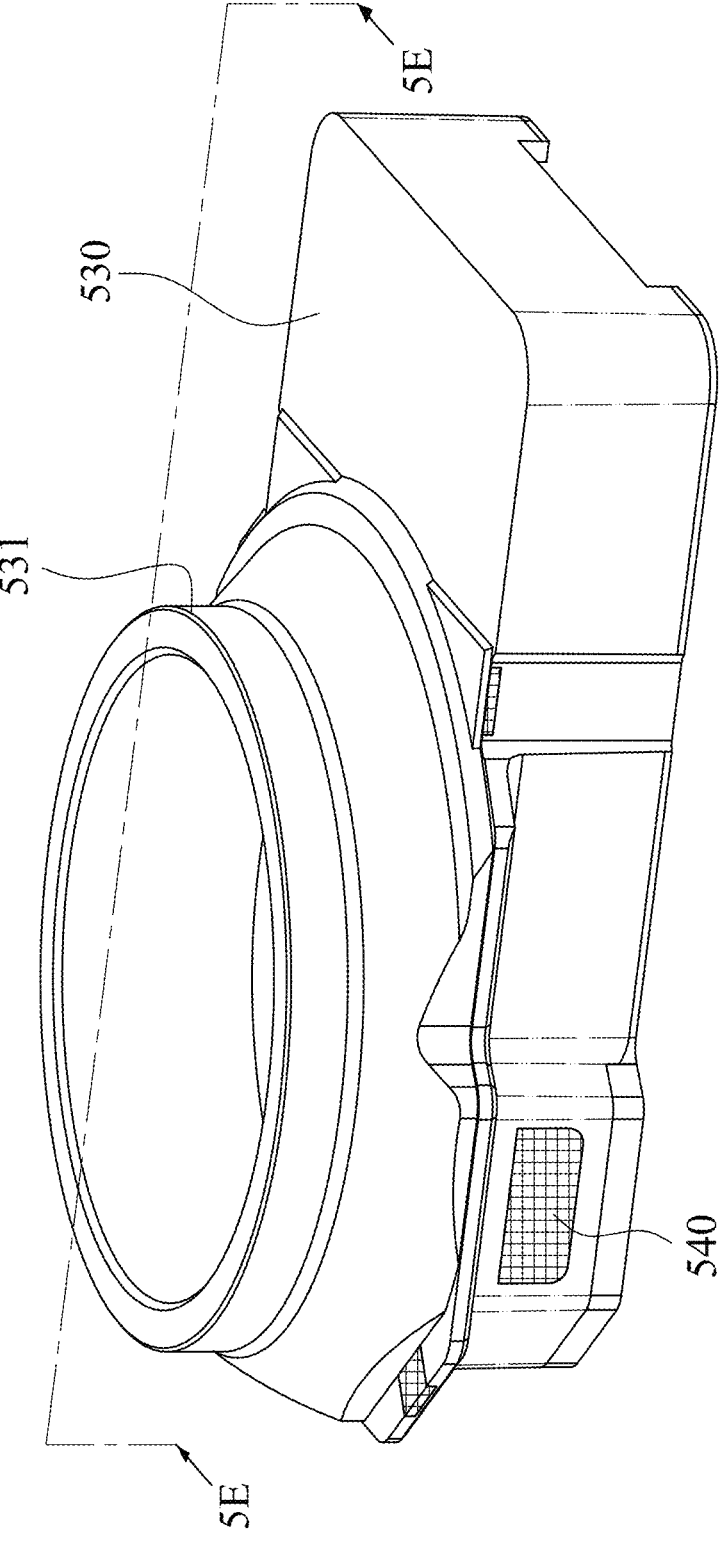
FIG. 5D is a three dimensional schematic view of the optical reflecting assembly according to the 5th embodiment in FIG. 5A.
Figure 5E:
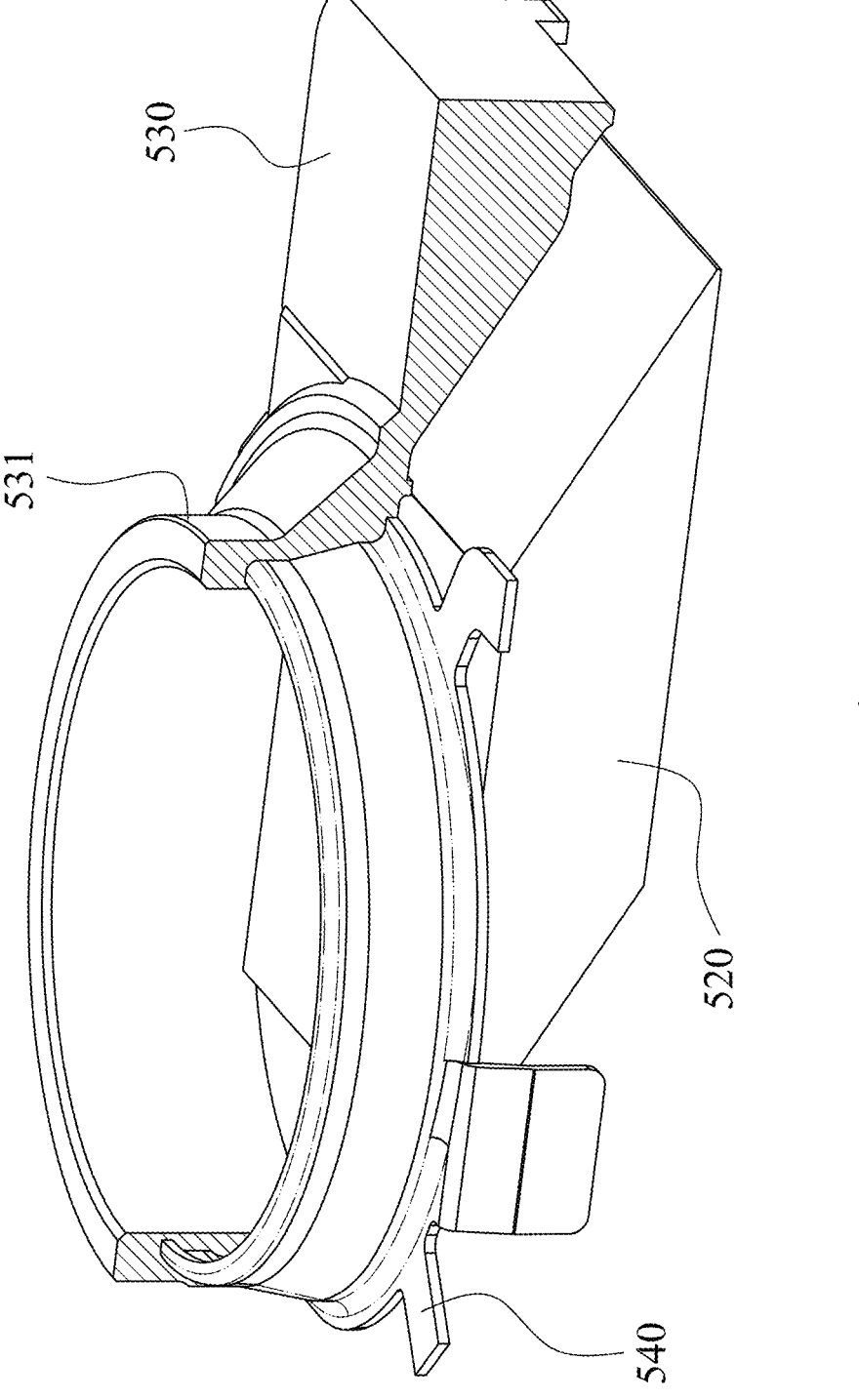
FIG. 5E is a partially cross-sectional view along line 5E-5E of the optical reflecting assembly according to the 5th embodiment in FIG. 5D.

FIG. 5D is a three dimensional schematic view of the optical reflecting assembly according to the 5th embodiment in FIG. 5A. FIG. 5E is a partially cross-sectional view along line 5E-5E of the optical reflecting assembly according to the 5th embodiment in FIG. 5D. In FIG. 5A to FIG. 5E, the optical reflecting assembly includes a reflective member 520, a reflective element holder 530 and a structure component 540. The reflective element holder 530 is correspondingly disposed to the reflective member 520. At least one portion of the structure component 540 is inserted in the reflective element holder 530, and the structure component 540 and the reflective element holder 530 can be formed integrally by insert molding. The rigidity of the reflective element holder 530 can be improved by inserting the structure component 540, so that the structure of the reflective element holder 530 can be maintained when being impacted by an external force, and the dimensional accuracy can also be maintained, or the bearing force can be increased during assembling to improve assembling reliability. Further, the volume variation of the reflective element holder 530 can also be inhibited by the structure component 540 when the temperature changes, and the relative displacement between the reflective element holder 530 and the reflective member 520 can be reduced. The temperature variation may come from the ambient temperature or the heat source generated by the light source.

The lens assembly 510 includes a plurality of lens elements (not shown in drawings), wherein an optical axis (not shown in drawings) passes through the lens elements of the lens assembly 510. Furthermore, the lens elements include at least one glass lens element, and the glass lens element can bear the environment of high temperature and high humidity.

In FIG. 5B, the reflective member 520 includes a reflective surface 521, a light incident surface 522, a light exiting surface 523 and two connecting surfaces 524, wherein the light enters the reflective surface 521 and the light is folded via the reflective surface 521, the light enters and exits from the light incident surface 522 and the light exiting surface 523 of the reflective member 520, respectively. The connecting surfaces 524 are connected to the light incident surface 522, the light exiting surface 523 and the reflective surface 521. Specifically, the reflective member 520 can be made of a hard brittle material, or the reflective member 520 can be made of a plastic material, and the surface is coated with a reflective layer. The hard brittle material can be glass, polystyrene (PS), polycarbonate (PC), polymethyl methacrylate (PMMA), etc., which is not limited thereto. Due to the hard brittle material, such as a glass material, is easy to be broken when impacted by the external force, so that the reflective member 520 needs the protection of the structure component 540. In the 5th embodiment, the reflective member 520 is composed of a plurality of mirrors, and a number of the reflective surface 521 of the reflective member 520 is four.

In FIG. 5B, FIG. 5D and FIG. 5E, the reflective element holder 530 includes a lens holding portion 531, and the reflective element holder 530 includes an assembling surface 532 and a fixed member 534. The lens holding portion 531 is for assembling and positioning the lens assembly 510, the assembling surface 532 is correspondingly disposed to the reflective member 520, and the fixed member 534 is for fixing the reflective member 520. It must be noted that, due to the reflective member 520 has the high requirement on the flatness of the assembling surface 532, the structure component 540 is required to maintain the flatness. In the 5th embodiment, the lens holding portion 531 assembles the lens assembly 510 indirectly by a lens barrel 550, or the lens holding portion 531 and the lens barrel 550 can be formed integrally, so that the lens holding portion 531 can assemble the lens assembly 510 directly.

In FIG. 5B and FIG. 5C, the reflective element holder 530 includes two light passing holes 533, wherein a light (not shown in drawings) passes through the light passing holes 533, and geometric center axes of the light passing holes 533 do not coincide with each other.

In FIG. 5C, a volume ratio of the structure component 540 inserted in the reflective element holder 530 is more than 90% in an overall volume of the structure component 540, and the structure component 540 does not protrude from a surface of the reflective element holder 530. Therefore, the structural rigidity of the reflective element holder 530 can be further improved, and the interference of the structure component 540 with other components can be avoided.

Figure 5F:
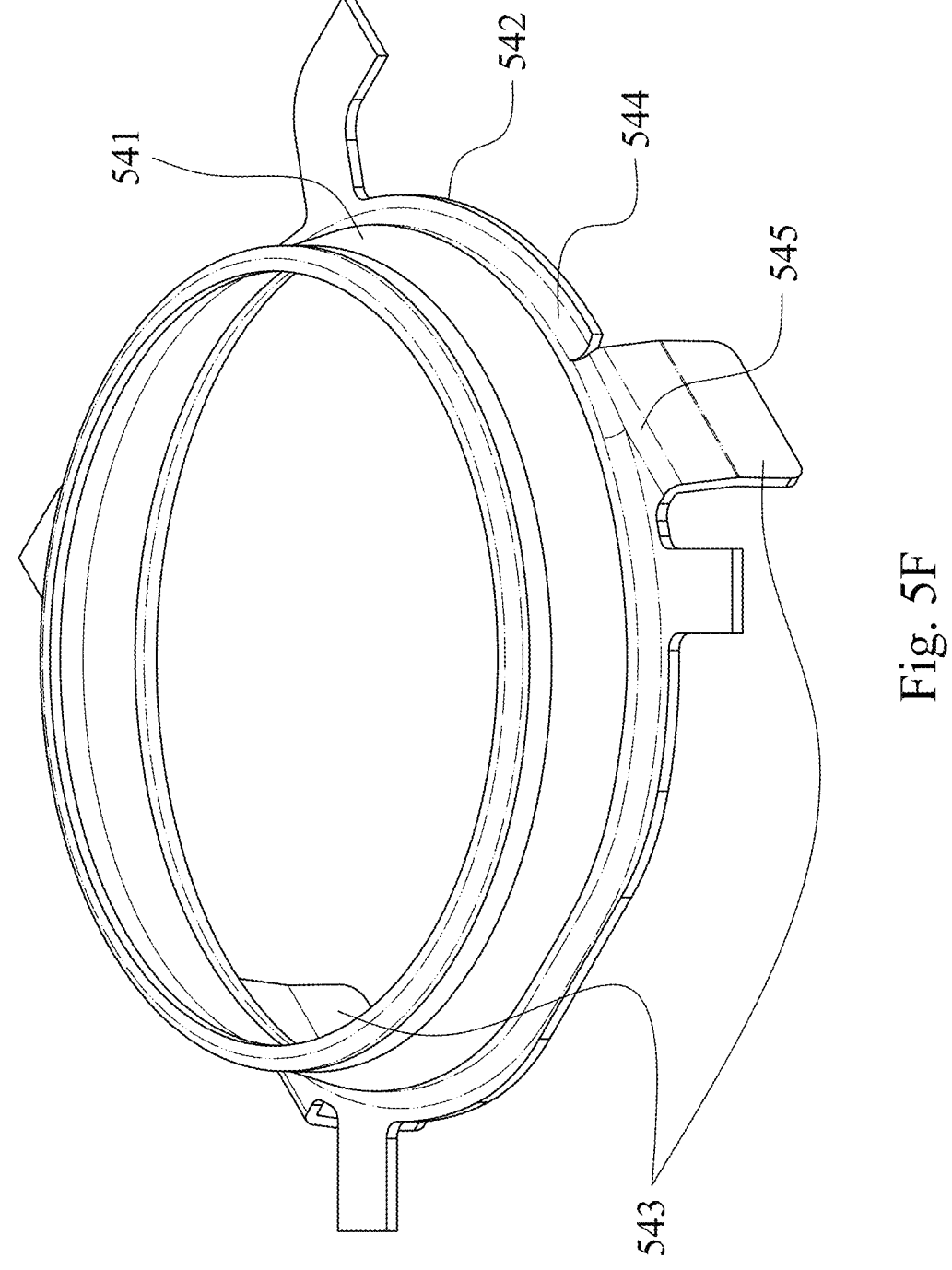
FIG. 5F is a three dimensional schematic view of the structure component according to the 5th embodiment in FIG. 5A.
Figure 5G:
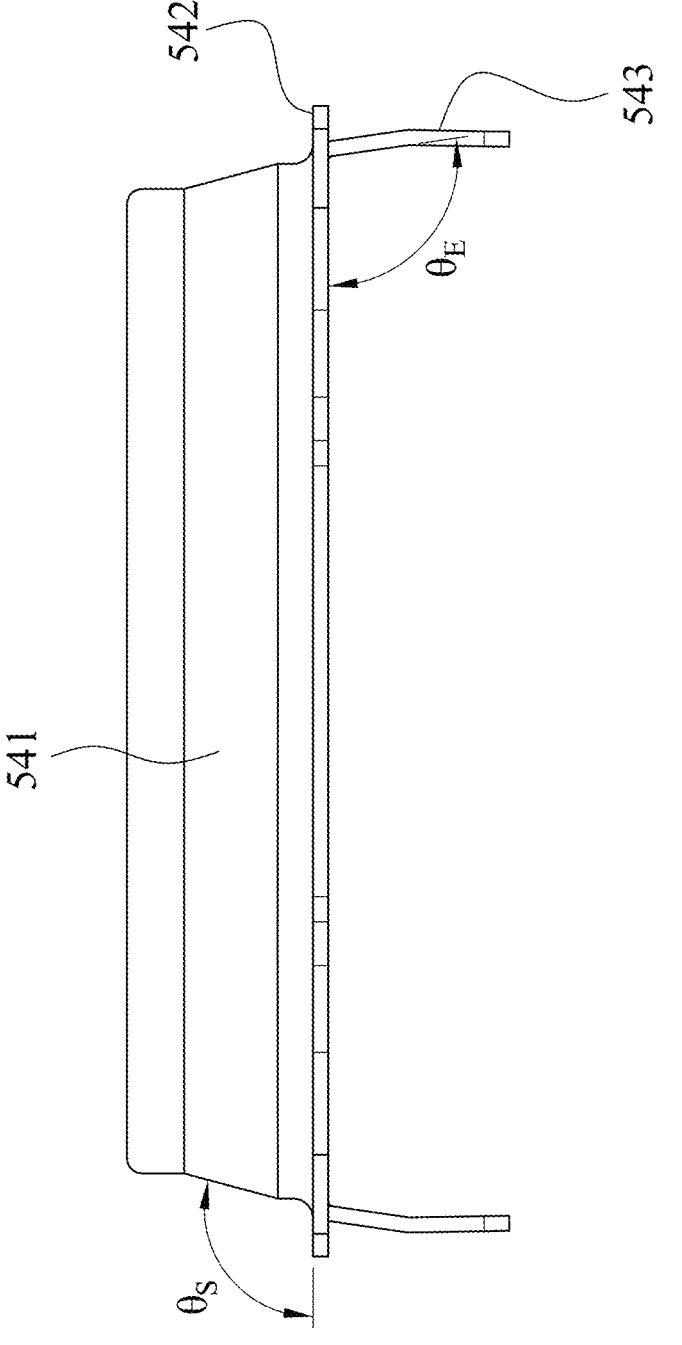
FIG. 5G is a front view of the structure component according to the 5th embodiment in FIG. 5A.

FIG. 5F is a three dimensional schematic view of the structure component 540 according to the 5th embodiment in FIG. 5A. FIG. 5G is a front view of the structure component 540 according to the 5th embodiment in FIG. 5A. In FIG. 5F and FIG. 5G, the structure component 540 is made of a metal material and has a three-dimensional structure, and the structure component 540 includes a first supporting wall 541, a second supporting wall 542 and at least one extending wall 543. The first supporting wall 541 and the second supporting wall 542 are bent to form a first bending line 544 with an angle. The extending wall 543 and the second supporting wall 542 are bent to form an extending bending line 545, and the extending bending line 545 is a non-closed line. By arranging the first bending line 544 and the extending bending line 545, the structure component 540 can be the three-dimensional structure, so that it is favorable for improving the rigidity of the overall structure by bearing the stress of different directions. In the 5th embodiment, a number of the extending wall 543 is two.

The structure component 540 made of the metal material has the higher Young's modulus, so that the deformation by the stress can be smaller. The metal surface can be performed the surface treatment, such as a roughening treatment or a blackening treatment, wherein the roughening treatment can improve the bonding strength between the plastic material and the metal material, and the blackening treatment can reduce the light reflectivity. In detail, the structure component 540 can be made of a metal plate with a thickness of 0.15 mm by the stamping process, and the material of the metal plate can be stainless steel, aluminum, aluminum alloy, etc., which is not limited thereto.

Specifically, the non-closed line is a line section opened at two ends. The first bending line 544 and the extending bending line 545 are not the decorative lines on the structure component 540, but the crease formed at the bending section when stamping the metal plate. Further, the first bending line 544 and the extending bending line 545 can be a round corner, and a radius of curvature of the round corner is related to the angle of the bending.

In FIG. 5F, a length of the extending bending line 545 can be smaller than a length of the first bending line 544, wherein the first bending line 544 can be a straight line or a curved line, and the extending bending line 545 can be a straight line. Specifically, the extending wall 543 has the use of supporting and protecting the reflective member 520. From the edge of the first supporting wall 541 or the second supporting wall 542 partially bent and extended, the extending wall 543 can be cooperated with the complex shape of the reflective element holder 530 by the shorter extending bending line 545. Further, the mass production manufacturability can be improved by the straight extending bending line 545.

In FIG. 5C and FIG. 5G, when the angle between the first supporting wall 541 and the second supporting wall 542 after being bent is es, a projection of the reflective member 520 and the structure component 540 is overlapped viewed along a direction D1, a minimum distance between the reflective member 520 and the structure component 540 on the direction D1 is $D_R$, and an angle between the extending wall 543 and the second supporting wall 542 after being bent is $\theta_E$, the following conditions of the Table 3 are satisfied.

TABLE 3

| 5th Embodiment | | | |
|---|---|---|---|
| $\theta_S$ (degree) | 105 | $\theta_E$ (degree) | 98 |
| $D_R$ (mm) | 0.16 | | |

Furthermore, the structures and the configurations of the remaining elements in the 5th embodiment are the same as those in the 1st embodiment, and will not be described in herein.

6th Embodiment

Figure 6:
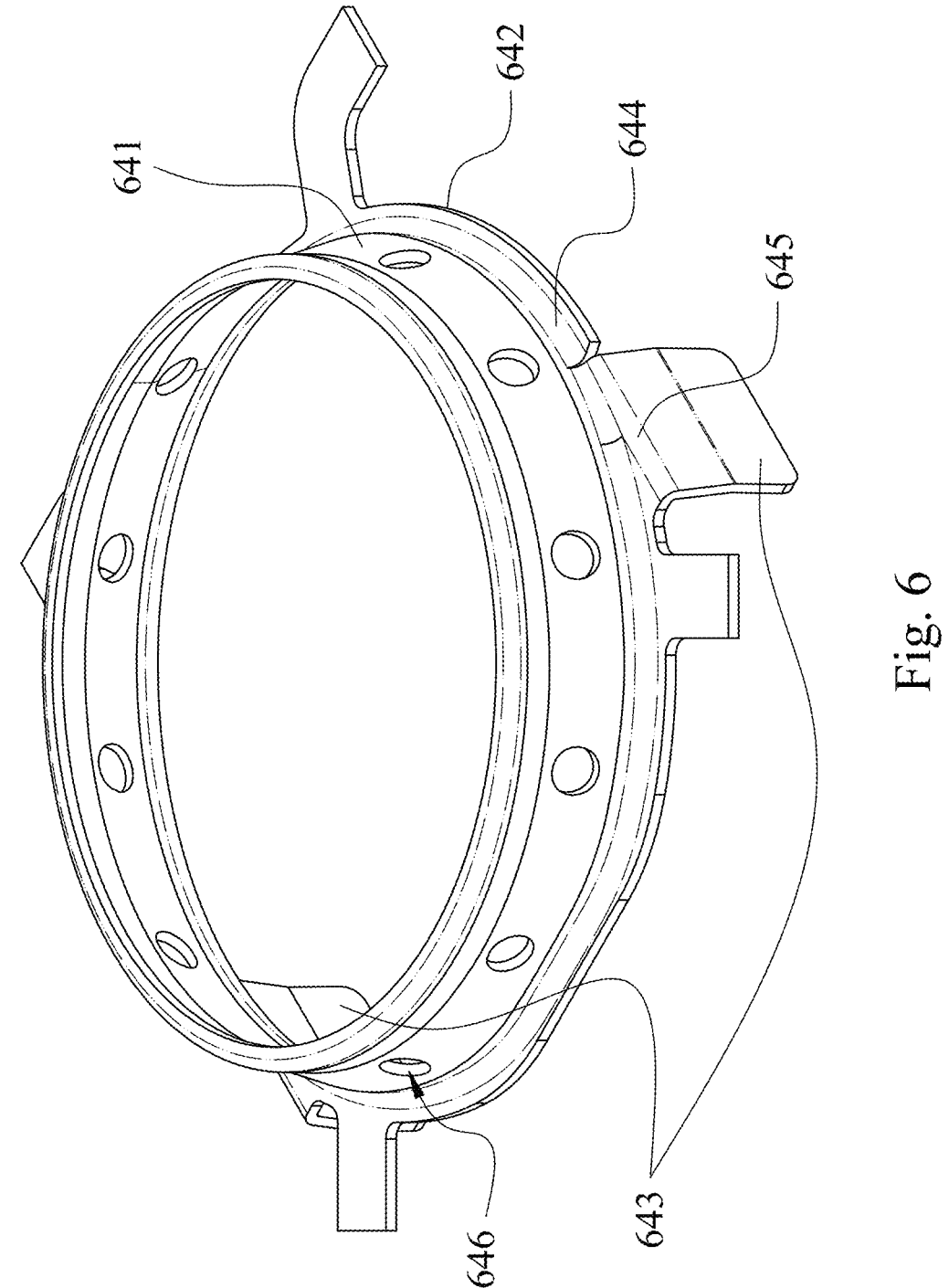
FIG. 6 is a three dimensional schematic view of a structure component according to the 6th embodiment of the present disclosure.

FIG. 6 is a three dimensional schematic view of a structure component 640 according to the 6th embodiment of the present disclosure. In FIG. 6, the structure component 640 is made of a metal material and has a three-dimensional structure, and the structure component 640 includes a first supporting wall 641, a second supporting wall 642 and at least one extending wall 643. The first supporting wall 641 and the second supporting wall 642 are bent to form a first bending line 644 with an angle. The extending wall 643 and the second supporting wall 642 are bent to form an extending bending line 645, and the extending bending line 645 is a non-closed line. By arranging the first bending line 644 and the extending bending line 645, the structure component 640 can be the three-dimensional structure, so that it is favorable for improving the rigidity of the overall structure by bearing the stress of different directions. In the 6th embodiment, a number of the extending wall 643 is two.

Furthermore, the structure component 640 includes a plurality of through holes 646, and the through holes 646 are passed through the first supporting wall 641, wherein the shape of the through holes 646 is not limited thereto. Therefore, the quality of the injection molding can be improved, the bonding strength between the plastic and the metal can be increased, and the weight of the structure component 640 can be reduced at the same time.

It must be noted that the structure component 640 of the 6th embodiment can be applied to the optical lens element module 500 of the 5th embodiment, but is not limited thereto.

Furthermore, the structures and the configurations of the remaining elements in the 6th embodiment are the same as those in the 1st embodiment and the 5th embodiment, and will not be described in herein.

7th Embodiment

Figure 7A:
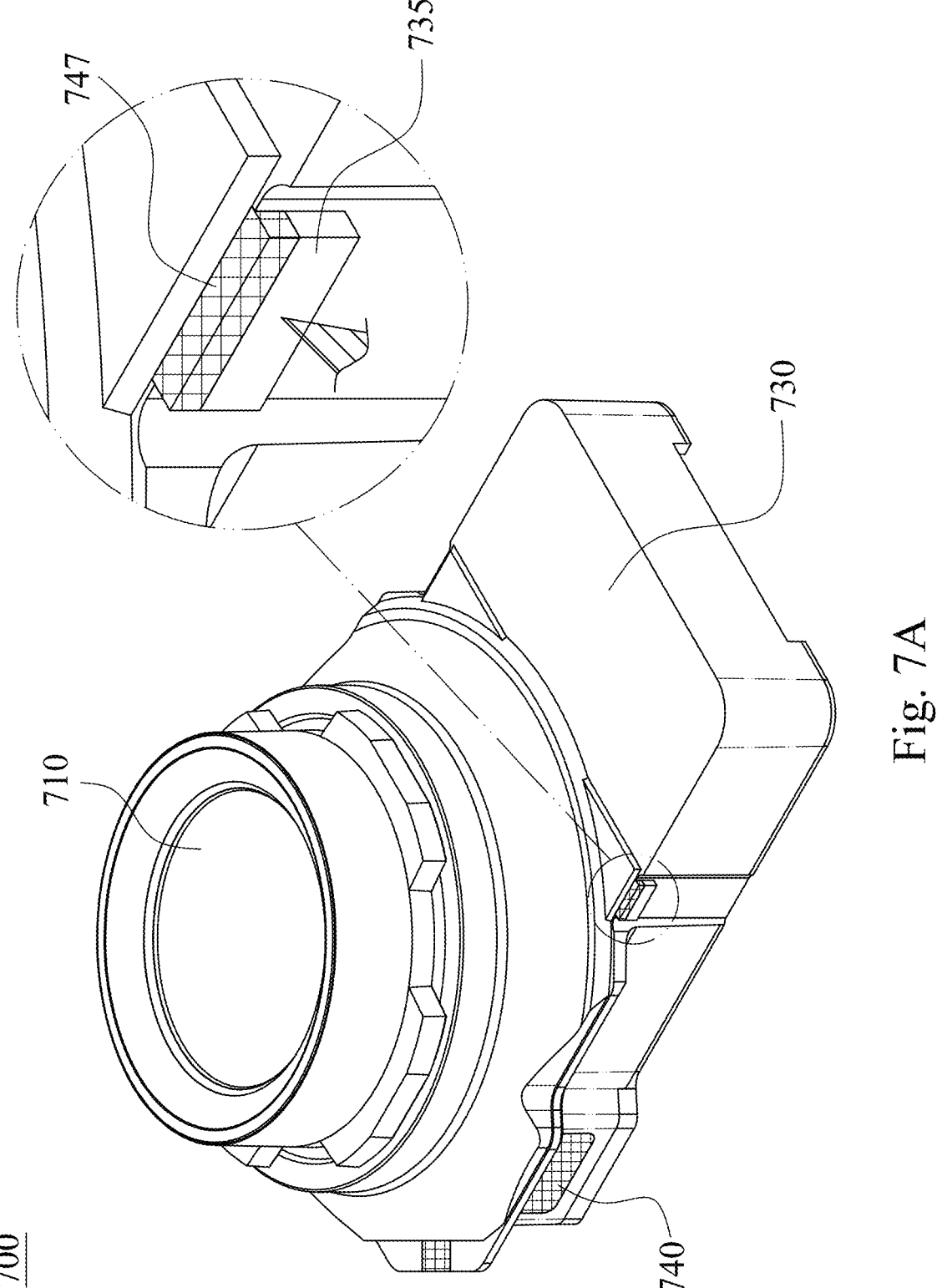
FIG. 7A is a three dimensional schematic view of an optical lens element module according to the 7th embodiment of the present disclosure.
Figure 7B:
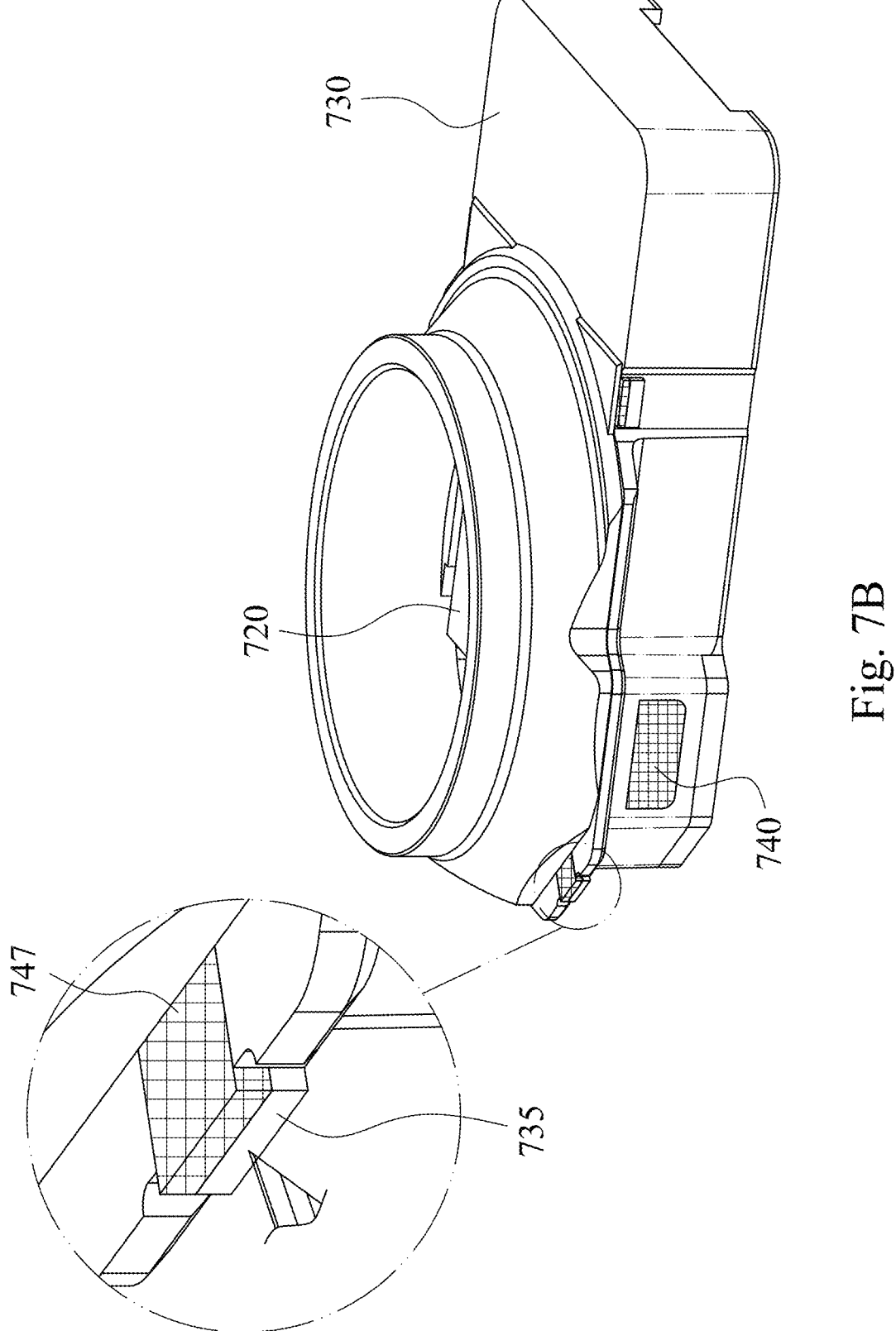
FIG. 7B is a three dimensional schematic view of the optical reflecting assembly according to the 7th embodiment in FIG. 7A.

FIG. 7A is a three dimensional schematic view of an optical lens element module 700 according to the 7th embodiment of the present disclosure. FIG. 7B is a three dimensional schematic view of the optical reflecting assembly according to the 7th embodiment in FIG. 7A. In FIG. 7A to FIG. 7B, the optical lens element module 700 includes an optical reflecting assembly (not shown in drawings) and a lens assembly 710.

The optical reflecting assembly includes a reflective member 720, a reflective element holder 730 and a structure component 740. The reflective element holder 730 is correspondingly disposed to the reflective member 720. At least one portion of the structure component 740 is inserted in the reflective element holder 730, and the structure component 740 and the reflective element holder 730 can be formed integrally by insert molding. The rigidity of the reflective element holder 730 can be improved by inserting the structure component 740, so that the structure of the reflective element holder 730 can be maintained when being impacted by an external force, and the dimensional accuracy can also be maintained, or the bearing force can be increased during assembling to improve assembling reliability. Further, the volume variation of the reflective element holder 730 can also be inhibited by the structure component 740 when the temperature changes, and the relative displacement between the reflective element holder 730 and the reflective member 720 can be reduced. The temperature variation may come from the ambient temperature or the heat source generated by the light source.

The reflective element holder 730 includes a gate 735, and the structure component 740 includes an exposed portion 747. The exposed portion 747 is exposed to the reflective element holder 730, and the gate 735 is disposed adjacent to the exposed portion 747. Therefore, the quality of the injection molding can be improved by the abovementioned disposition, and is favorable for the mass production.

Furthermore, the structures and the configurations of the remaining elements in the 7th embodiment are the same as those in the 1st embodiment and the 5th embodiment, and will not be described in herein.

8th Embodiment

Figure 8A:
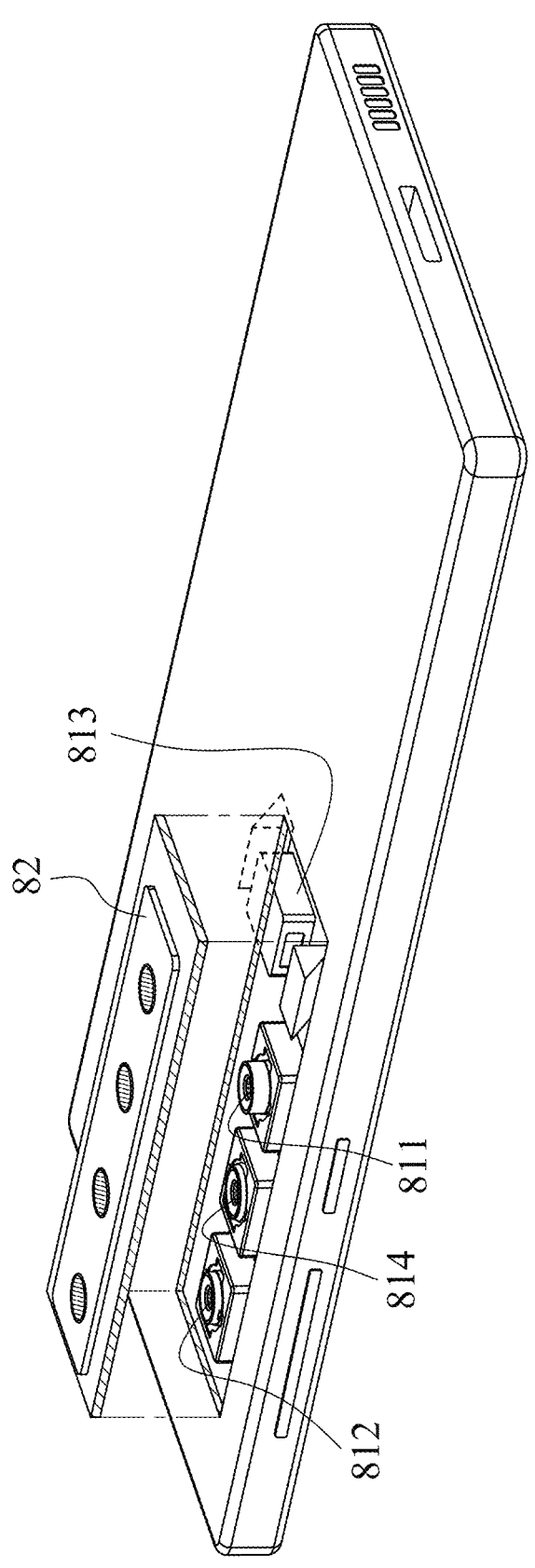
FIG. 8A is a schematic view of an electronic device according to the 8th embodiment of the present disclosure.

FIG. 8A is a schematic view of an electronic device 80 according to the 8th embodiment of the present disclosure.

Figure 8B:
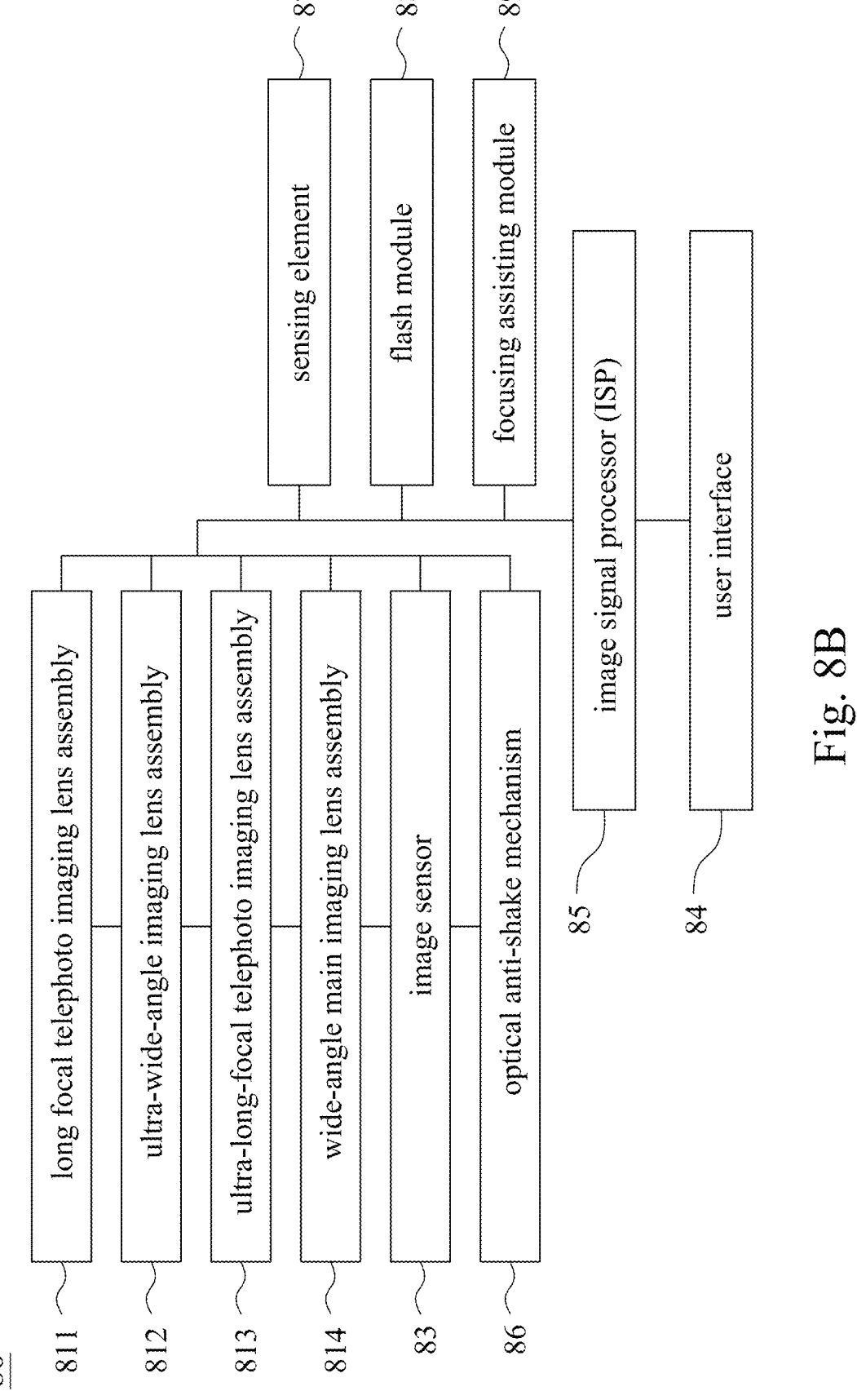
FIG. 8B is a block diagram of the electronic device according to the 8th embodiment in FIG. 8A.

FIG. 8B is a block diagram of the electronic device 80 according to the 8th embodiment in FIG. 8A. In FIG. 8A and FIG. 8B, the electronic device 80 is a smart phone and includes an optical lens element module (not shown in drawings), wherein the optical lens element module includes an optical reflecting assembly (not shown in drawings) and a lens assembly (not shown in drawings).

In the 8th embodiment, the electronic device 80 includes four imaging lens assemblies, which are a long focal telephoto imaging lens assembly 811, an ultra-wide-angle imaging lens assembly 812, an ultra-long-focal telephoto imaging lens assembly 813 and a wide-angle main imaging lens assembly 814, respectively. Furthermore, the electronic device 80 can achieve the function of the optical zoom by switching the different viewing angles of the imaging lens assembly. It must be noted that an imaging lens assembly cover 82 is only for signifying the long focal telephoto imaging lens assembly 811, the ultra-wide-angle imaging lens assembly 812, the ultra-long-focal telephoto imaging lens assembly 813 and the wide-angle main imaging lens assembly 814 which inside the electronic device 80, but not indicating that the imaging lens assembly cover 82 is removable. In detail, the ultra-long-focal telephoto imaging lens assembly 813 can be any one of the aforementioned optical lens element module in the 1st embodiment to the 7th embodiment, but is not limited thereto.

The electronic device 80 can further include an image sensor 83 and a user interface 84. The image sensor 83 is disposed on the image surface (not shown in drawings) of each of the long focal telephoto imaging lens assembly 811, the ultra-wide-angle imaging lens assembly 812, the ultra-long-focal telephoto imaging lens assembly 813 and the wide-angle main imaging lens assembly 814. The user interface 84 can be a touch screen or a display screen, but is not limited thereto.

Furthermore, the user enters the shooting mode through the user interface 84 of the electronic device 80. The long focal telephoto imaging lens assembly 811, the ultra-wide-angle imaging lens assembly 812, the ultra-long-focal telephoto imaging lens assembly 813 and the wide-angle main imaging lens assembly 814 converge the imaging light on the image sensor 83 and output an electronic signal of the image to the image signal processor (ISP) 85.

To satisfy with a specification of the camera module of the electronic device 80, the electronic device 80 can further include an optical anti-shake mechanism 86, which can be an optical image stabilization (01S). Further, the electronic device 80 can further include at least one auxiliary optical element (not shown in drawings) and at least one sensing element 87. According to the 8th embodiment, the auxiliary optical element is a flash module 88 and a focusing assisting module 89. The flash module 88 is for compensating a color temperature, and the focusing assisting module 89 can be an infrared distance measurement component, a laser focus module, etc. The sensing element 87 can have functions for sensing physical momentum and kinetic energy, such as an accelerator, a gyroscope, a Hall Effect Element, to sense shaking or jitters applied by hands of the user or external environments. Accordingly, an auto-focusing mechanism and the optical anti-shake mechanism 86 disposed on the optical lens element module (which is the long focal telephoto imaging lens assembly 811, the ultra-wide-angle imaging lens assembly 812, the ultra-long-focal telephoto imaging lens assembly 813 and the wide-angle main imaging lens assembly 814) of the electronic device 80 can be enhanced to achieve the superior image quality. Furthermore, the electronic device 80 according to the present disclosure can have a capturing function with multiple modes, such as taking optimized selfies, high dynamic range (HDR) under a low light condition, 4K resolution recording, etc. Moreover, the user can view a captured image of the camera through the touch screen directly, and manually operate the view finding range on the touch screen to achieve the autofocus function of what you see is what you get.

Further, the electronic device 80 can further include but not limited to a display unit, a control unit, a storage unit, a RAM, a ROM or the combination thereof.

Furthermore, the structures and the configurations of the remaining elements in the 8th embodiment are the same as those in the 1 st embodiment to the 7th embodiment, and will not be described in herein.

9th Embodiment

Figure 9A:
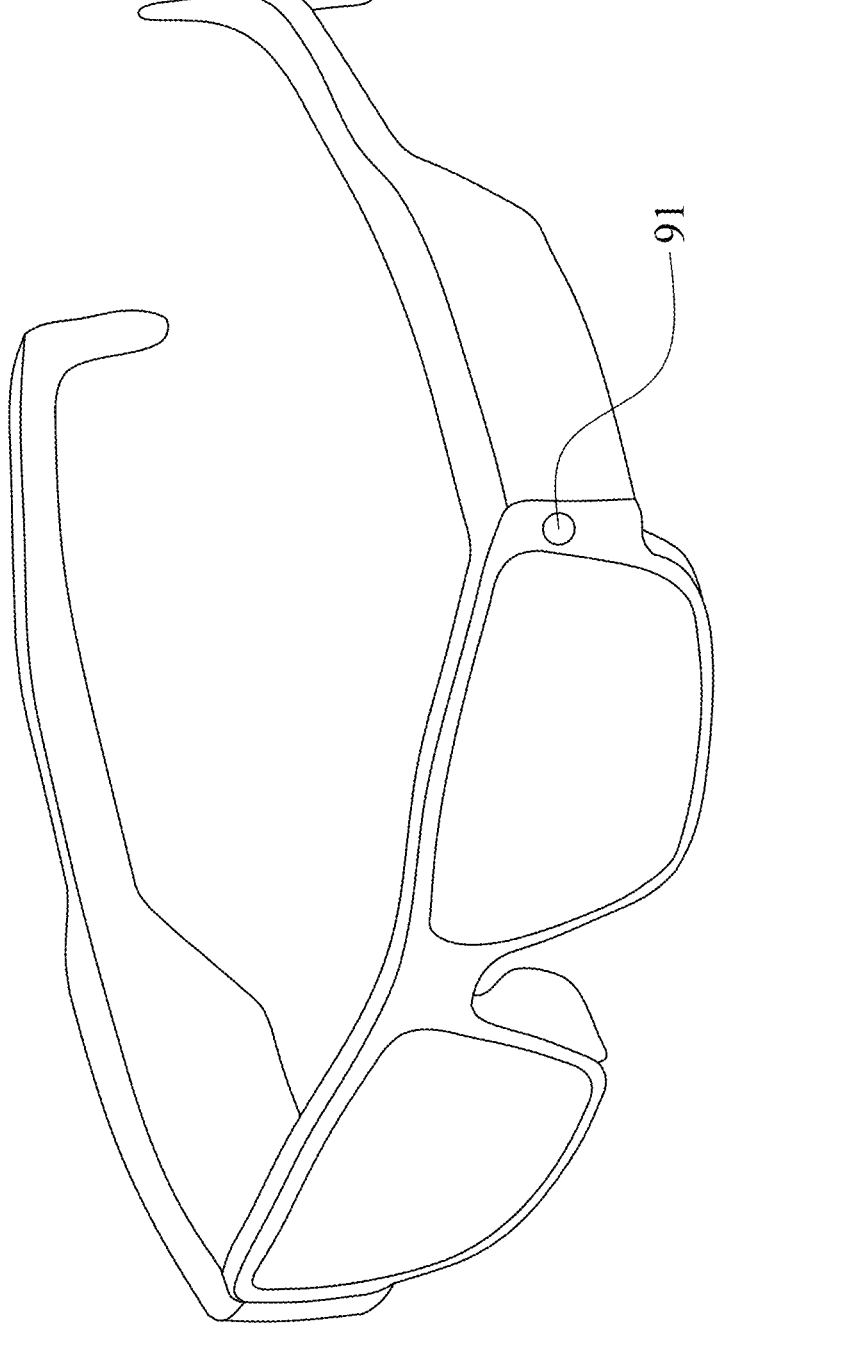
FIG. 9A is a schematic view of an electronic device according to the 9th embodiment of the present disclosure.
Figure 9B:
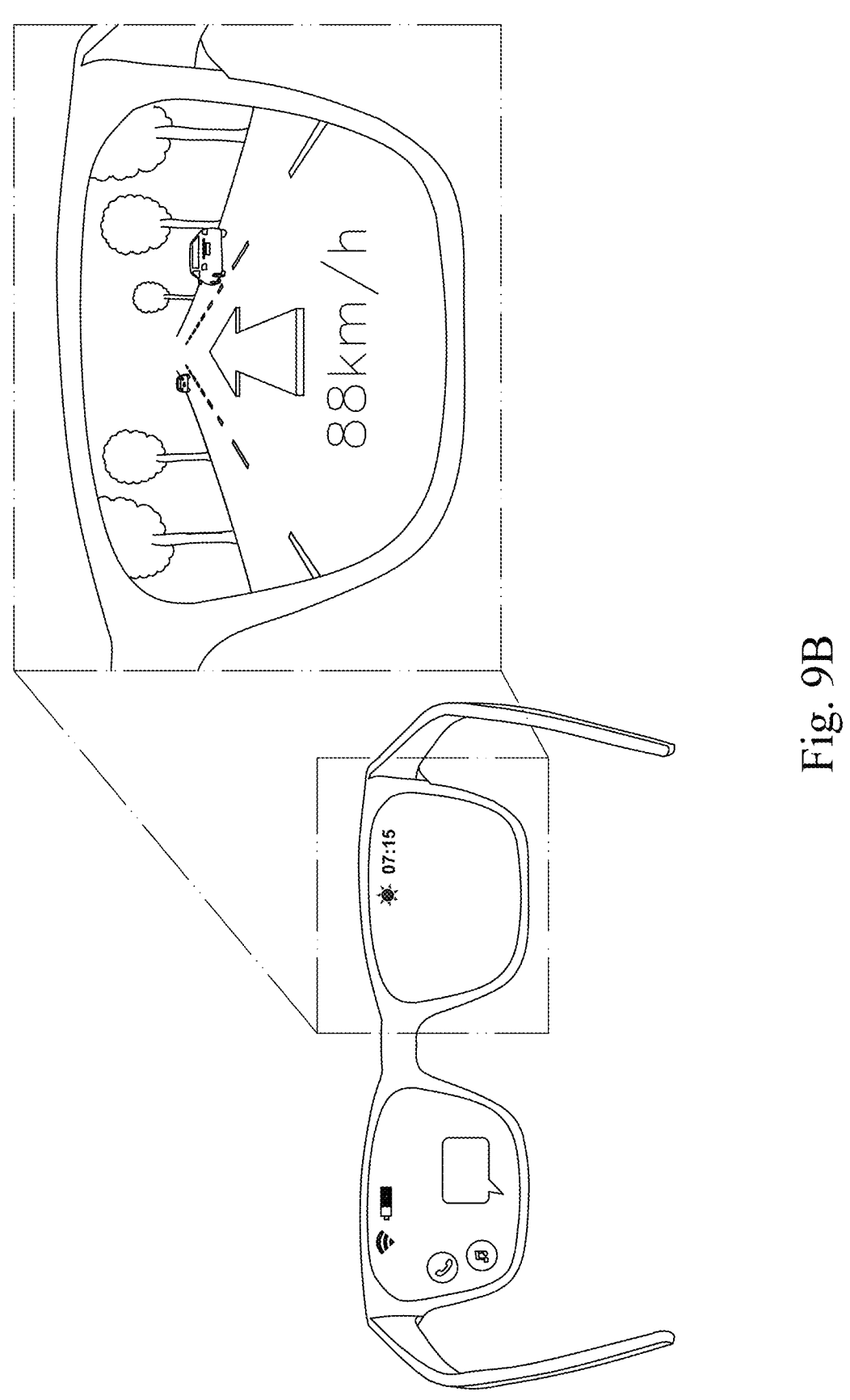
FIG. 9B is a schematic view showing a use situation of the electronic device according to the 9th embodiment in FIG. 9A.
Figure 9C:
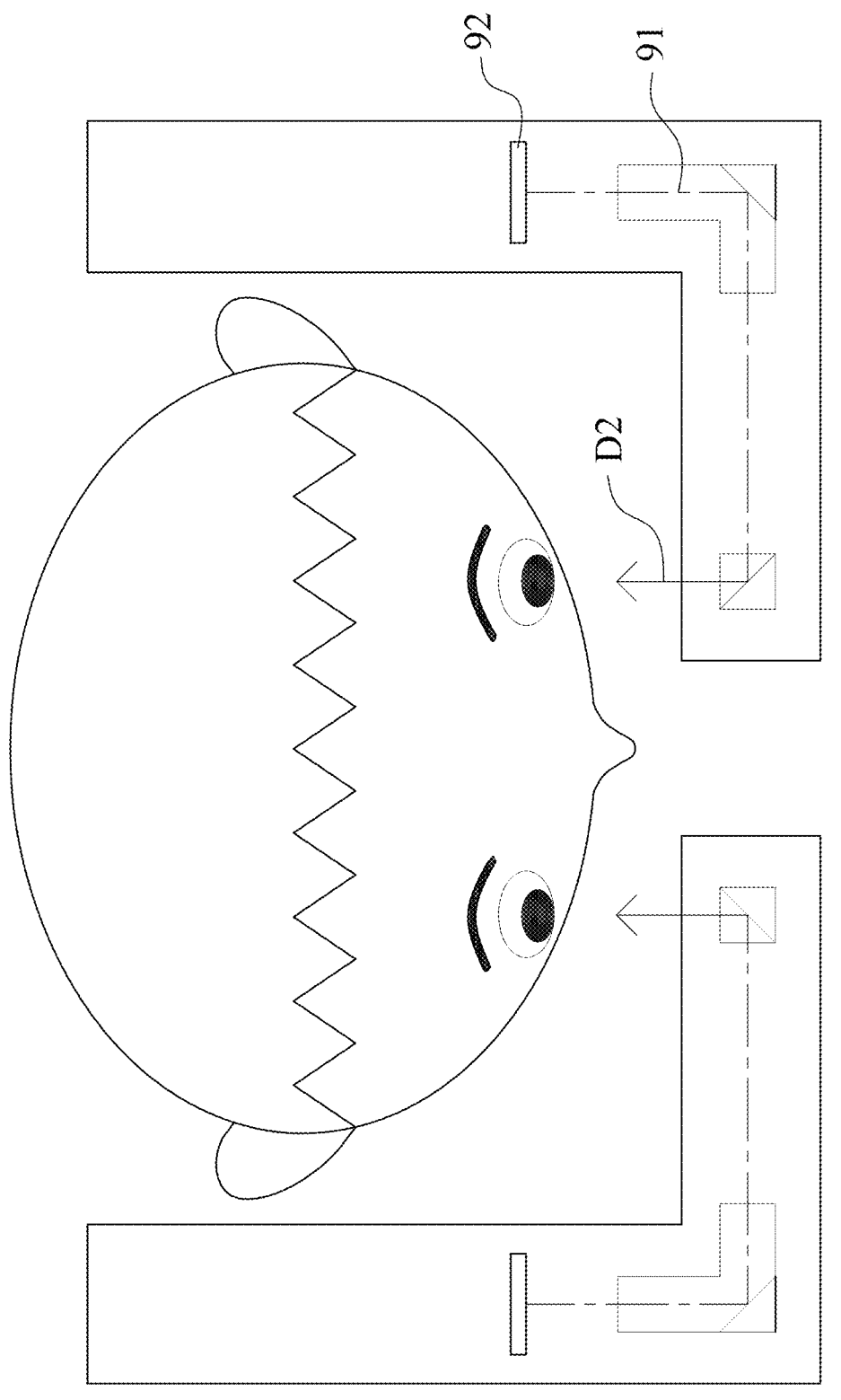
FIG. 9C is a schematic view showing a use state of the electronic device according to the 9th embodiment in FIG. 9A.

FIG. 9A is a schematic view of an electronic device 90 according to the 9th embodiment of the present disclosure. FIG. 9B is a schematic view showing a use situation of the electronic device 90 according to the 9th embodiment in FIG. 9A. FIG. 9C is a schematic view showing a use state of the electronic device 90 according to the 9th embodiment in FIG. 9A. In FIG. 9A to FIG. 9C, the electronic device 90 is a head-mounted device, and the head-mounted device can be an augmented reality (AR) device.

The electronic device 90 includes an optical lens element module 91 and a display panel module 92, wherein the optical lens element module 91 is disposed on an image side end of the display panel module 92, and the optical lens element module 91 is for transmitting and projecting the image to the front of the user along a direction D2. Specifically, the actual scene and the dummy message can be combined and transmitted to the front of the user by the electronic device 90. In FIG. 9B, the dummy information can be a message notification, a time display, a battery status display, a signal status display and a speed display, but it is not limited thereto.

In detail, the optical lens element module 91 can be any one of the aforementioned optical lens element module in the 1st embodiment to the 7th embodiment, and the display panel module 92 can be digital light processing (DLP), liquid crystal display (LCD), etc., but it is not limited thereto. Furthermore, the optical lens element module 91 can be for taking pictures or sensing the surrounding environment and objects.

Furthermore, the structures and the configurations of the remaining elements in the 9th embodiment are the same as those in the 1 st embodiment to the 7th embodiment, and will not be described in herein.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical reflecting assembly, comprising:

a reflective member, comprising:

a reflective surface, a light entering the reflective surface and folded via the reflective surface;

a reflective element holder, comprising:

an assembling surface correspondingly disposed to the reflective member; and a structure component, wherein the structure component is made of a metal material and has a three-dimensional structure, at least one portion of the structure component is inserted in the reflective element holder, and the structure component comprises:

a first supporting wall;

a second supporting wall, wherein the first supporting wall and the second supporting wall are bent to form a first bending line with an angle; and at least one extending wall, wherein the at least one extending wall and the second supporting wall are bent to form an extending bending line, and the extending bending line is a non-closed line;

wherein the angle between the first supporting wall and the second supporting wall after being bent is $\theta_S$; a projection of the reflective member and the structure component is overlapped viewed along a direction, and a minimum distance between the reflective member and the structure component on the direction is $D_R$, and the following conditions are satisfied:

$$90 \text{ degrees} \leq \theta_S \leq 164 \text{ degrees; and}$$

$$0.05 \text{ mm} < D_R < 1.8 \text{ mm;}$$

wherein the structure component further comprises an exposed portion, the exposed portion is exposed to the reflective element holder.

2. The optical reflecting assembly of claim 1, wherein the structure component and the reflective element holder are formed integrally.

3. The optical reflecting assembly of claim 2, wherein the reflective element holder comprises two light passing holes, the light passes through the two light passing holes.

4. The optical reflecting assembly of claim 3, wherein an angle between the at least one extending wall and the second supporting wall after being bent is OE, and the following condition is satisfied:

$$90 \text{ degrees} \leq \theta_E \leq 152 \text{ degrees.}$$

5. The optical reflecting assembly of claim 4, wherein a length of the extending bending line is smaller than a length of the first bending line.

6. The optical reflecting assembly of claim 5, wherein the extending bending line is a straight line.

7. The optical reflecting assembly of claim 3, wherein a number of the at least one extending wall is at least two.

8. The optical reflecting assembly of claim 7, wherein the reflective member further comprises a light incident surface, a light exiting surface and two connecting surfaces, the light enters and exits from the light incident surface and the light exiting surface of the reflective member, respectively, the two connecting surfaces are connected to the light incident surface, the light exiting surface and the reflective surface, each of the at least two extending walls comprises a flat surface, and each of the flat surfaces is correspondingly disposed to each of the connecting surfaces.

9. The optical reflecting assembly of claim 8, wherein the at least two extending walls are symmetrically arranged.

10. The optical reflecting assembly of claim 3, wherein the structure component comprises a plurality of through holes, and the through holes are passed through at least one of the first supporting wall, the second supporting wall and the at least one extending wall.

11. The optical reflecting assembly of claim 3, wherein a volume ratio of the structure component inserted in the reflective element holder is more than 90% in an overall volume of the structure component.

12. The optical reflecting assembly of claim 11, wherein the structure component does not protrude from a surface of the reflective element holder.

13. The optical reflecting assembly of claim 3, wherein the reflective member is made of a glass material.

14. The optical reflecting assembly of claim 1, wherein the reflective element holder further comprises a gate.

15. The optical reflecting assembly of claim 14, wherein the gate is disposed adjacent to the exposed portion.

16. An optical lens element module, comprising:

the optical reflecting assembly of claim 1, wherein the reflective element holder further comprises a lens holding portion; and a lens assembly, wherein the lens assembly comprises a plurality of lens elements, an optical axis passes through the lens elements, and the lens holding portion is for assembling and positioning the lens assembly.

17. The optical lens element module of claim 16, wherein the lens elements comprise at least one glass lens element.

18. An electronic device, comprising:

the optical reflecting assembly of claim 1.

* * * * *